United States Patent [19]
Masreliez et al.

[11] Patent Number: 6,011,389
[45] Date of Patent: Jan. 4, 2000

[54] INDUCED CURRENT POSITION TRANSDUCER HAVING A LOW POWER ELECTRONIC CIRCUIT

[75] Inventors: Karl Masreliez, Bellevue; Nils Ingvar Andermo; Kim W. Atherton, both of Kirkland, all of Wash.

[73] Assignee: Mitutoyo Corporation, Kawasaki, Japan

[21] Appl. No.: 08/912,567

[22] Filed: Aug. 18, 1997

Related U.S. Application Data

[63] Continuation of application No. 08/441,769, May 16, 1995, abandoned.

[51] Int. Cl.$^7$ .............................. G01B 7/14; G01B 7/02; G01D 5/20
[52] U.S. Cl. ................................ 324/207.17; 324/207.24
[58] Field of Search ......................... 324/207.17, 207.22, 324/207.24, 207.25, 239; 336/45, 30; 340/870.31, 870.32; 33/784, 819, 820

[56] References Cited

U.S. PATENT DOCUMENTS

| | | | |
|---|---|---|---|
| 2,905,874 | 9/1959 | Kelling | 318/28 |
| 3,090,933 | 5/1963 | Henry-Baudot . | |
| 3,502,968 | 3/1970 | Tobin, Jr. et al. | 324/40 |
| 3,688,187 | 8/1972 | Loos | 324/40 |
| 3,699,558 | 10/1972 | Hendley et al. | 340/196 |
| 3,816,003 | 6/1974 | Litke . | |
| 3,882,437 | 5/1975 | Geller | 336/123 |
| 3,936,734 | 2/1976 | Brandli et al. | 324/40 |
| 3,955,073 | 5/1976 | Carew et al. . | |

(List continued on next page.)

FOREIGN PATENT DOCUMENTS

| | | |
|---|---|---|
| 0 009 102 | 4/1980 | European Pat. Off. . |
| 647 316 | 1/1985 | Germany . |
| 2 064 125 | 6/1981 | United Kingdom . |
| 2 223 590 | 4/1990 | United Kingdom . |
| 2 241 788 | 9/1991 | United Kingdom . |
| 95/31696 | 11/1995 | WIPO . |

OTHER PUBLICATIONS

Heidenhain, Dr. Johannes, "NC Linear Encoders," *Heidenhain*, Traunreut, Germany, Sep. 1993, pp. 1–14.

"Digital Position Readout System, Instruction Manual," *Sony*, Sony Magnescale Inc., Japan, 1983, pp. 2–15.

Hitchcox, A., "Linear Transducers for Position Feedback," *Hydraulics & Pneumatics*, pp. 59–60, 62 and 64, Mar. 1991.

Heidenhain, Dr. Johannes, "Inductosyn," *Heidenhain*, West Germany, Nov. 1988, pp. 2–16.

Kostrov, D.S. and Yu. I. Steblev, "Design of Eddy–Current Transducers for Linear Displacements With Periodic Output Characteristics," *The Soviet Journal of Nondestructive Testing*, 22:10:696–702, Oct. 1986.

Heidenhain, Dr. Johannes, "General Catalog," *Heidenhain*, Traunreut, Germany, pp. 3–51, Nov. 1993.

"Industosyn Position Transducers for Commerical and Industrial Applications," *Farrand*, Farrand Controls, Valhalla, New York, Jan. 9, 1994.

*Primary Examiner*—Walter E. Snow
*Attorney, Agent, or Firm*—Oliff & Berridge, PLC

[57] ABSTRACT

An inductive transducer system for use in high accuracy applications such as linear or rotary encoders, employs two members movable relative to each other. A first, active member induces eddy currents in a second, passive member that lacks a power source or electrical wires connected thereto. The first, active member contains both a transmitter for generating a magnetic field and a receiver for receiving the field. The receiver has a plurality of symmetric loops. Electronic circuitry coupled to the receiver evaluates the relative position between the two members as the passive member disrupts the magnetic field received by the receiver. The inductive transducer can be readily manufactured using known printed circuit board technology, and is substantially immune to contamination by particles, including ferromagnetic particles, oil, water and other fluids. A pulse-driven drive circuit allows the inductive transducer to consume little power, and thus allows the transducer to be readily incorporated into hand-held, battery-powered measurement tools.

37 Claims, 17 Drawing Sheets

U.S. PATENT DOCUMENTS

| | | |
|---|---|---|
| 3,971,982 | 7/1976 | Törnblom .................................. 324/37 |
| 4,042,876 | 8/1977 | Visioli, Jr. ............................ 324/34 D |
| 4,063,362 | 12/1977 | Amsbury et al. . |
| 4,100,485 | 7/1978 | Rogers .................................... 324/208 |
| 4,103,222 | 7/1978 | Phillips et al. ......................... 324/207 |
| 4,112,365 | 9/1978 | Larson et al. .......................... 324/173 |
| 4,123,735 | 10/1978 | Mash et al. . |
| 4,127,814 | 11/1978 | Rasigade et al. ...................... 324/208 |
| 4,150,352 | 4/1979 | Pomella et al. ........................ 336/129 |
| 4,205,199 | 5/1980 | Mochizuki . |
| 4,210,865 | 7/1980 | Nikolaev et al. ...................... 324/207 |
| 4,226,024 | 10/1980 | Westerberg et al. . |
| 4,229,883 | 10/1980 | Kobashi . |
| 4,249,630 | 2/1981 | Lougheed et al. ..................... 180/168 |
| 4,378,465 | 3/1983 | Green et al. . |
| 4,401,986 | 8/1983 | Trenkler et al. . |
| 4,405,896 | 9/1983 | Akita . |
| 4,420,754 | 12/1983 | Andermo ........................... 340/870.37 |
| 4,425,511 | 1/1984 | Brosh .................................... 307/106 |
| 4,507,638 | 3/1985 | Brosh . |
| 4,551,847 | 11/1985 | Caldwell ................................ 377/24 |
| 4,560,929 | 12/1985 | Melnyk . |
| 4,564,835 | 1/1986 | Dhawan . |
| 4,572,951 | 2/1986 | Toda et al. . |
| 4,575,944 | 3/1986 | Lin ........................................... 33/138 |
| 4,611,269 | 9/1986 | Suzuki et al. . |
| 4,627,280 | 12/1986 | Hayashi et al. ....................... 73/290 R |
| 4,648,041 | 3/1987 | Tarr ........................................ 364/481 |
| 4,652,821 | 3/1987 | Kreft ...................................... 324/208 |
| 4,658,134 | 4/1987 | Okumura ............................. 250/231 R |
| 4,678,994 | 7/1987 | Davies .................................... 324/236 |
| 4,697,144 | 9/1987 | Howbrook .............................. 324/207 |
| 4,733,023 | 3/1988 | Tamaru et al. ......................... 178/20 |
| 4,737,698 | 4/1988 | McMullin et al. . |
| 4,737,709 | 4/1988 | Loftus .................................... 324/208 |
| 4,743,786 | 5/1988 | Ichikawa et al. ...................... 310/111 |
| 4,743,902 | 5/1988 | Andermo ........................... 340/870.37 |
| 4,747,215 | 5/1988 | Waikas ..................................... 33/140 |
| 4,757,244 | 7/1988 | Iwamoto et al. . |
| 4,812,757 | 3/1989 | Meins et al. ........................... 324/207 |
| 4,816,759 | 3/1989 | Ames et al. ............................ 324/207 |
| 4,833,919 | 5/1989 | Saito et al. ............................... 73/313 |
| 4,853,604 | 8/1989 | McMullin et al. . |
| 4,879,508 | 11/1989 | Andermo .............................. 324/61 R |
| 4,882,536 | 11/1989 | Meyer .................................... 324/61 R |
| 4,887,465 | 12/1989 | Bryne et al. . |
| 4,890,392 | 1/1990 | Komura et al. ........................... 33/762 |
| 4,893,071 | 1/1990 | Miller ..................................... 324/660 |
| 4,893,077 | 1/1990 | Auchterlonie ......................... 324/208 |
| 4,951,048 | 8/1990 | Ichikawa et al. . |
| 4,986,124 | 1/1991 | Bryne et al. . |
| 4,991,301 | 2/1991 | Hore ......................................... 33/366 |
| 4,998,105 | 3/1991 | Takekoshi et al. . |
| 5,023,559 | 6/1991 | Andermo ................................. 324/662 |
| 5,027,526 | 7/1991 | Crane ....................................... 33/763 |
| 5,036,275 | 7/1991 | Munch et al. ...................... 324/207.17 |
| 5,107,212 | 4/1992 | Dobler et al. ...................... 324/207.16 |
| 5,109,193 | 4/1992 | Pike .................................... 324/207.17 |
| 5,111,412 | 5/1992 | Törnblom ......................... 364/571.04 |
| 5,121,116 | 6/1992 | Taniguchi . |
| 5,175,497 | 12/1992 | Dobler et al. ..................... 324/207.25 |
| 5,200,698 | 4/1993 | Thibaud ............................ 324/207.22 |
| 5,225,830 | 7/1993 | Andermo et al. . |
| 5,233,294 | 8/1993 | Dreoni ............................... 324/207.16 |
| 5,260,651 | 11/1993 | Tischer et al. ..................... 324/207.16 |
| 5,280,239 | 1/1994 | Klimovitsky et al. ............ 324/207.26 |
| 5,291,782 | 3/1994 | Taylor ....................................... 73/319 |
| 5,369,890 | 12/1994 | Malz . |
| 5,373,147 | 12/1994 | Noda ....................................... 235/462 |
| 5,376,780 | 12/1994 | Klueter ................................... 235/462 |
| 5,477,621 | 12/1995 | Koizumi et al. . |

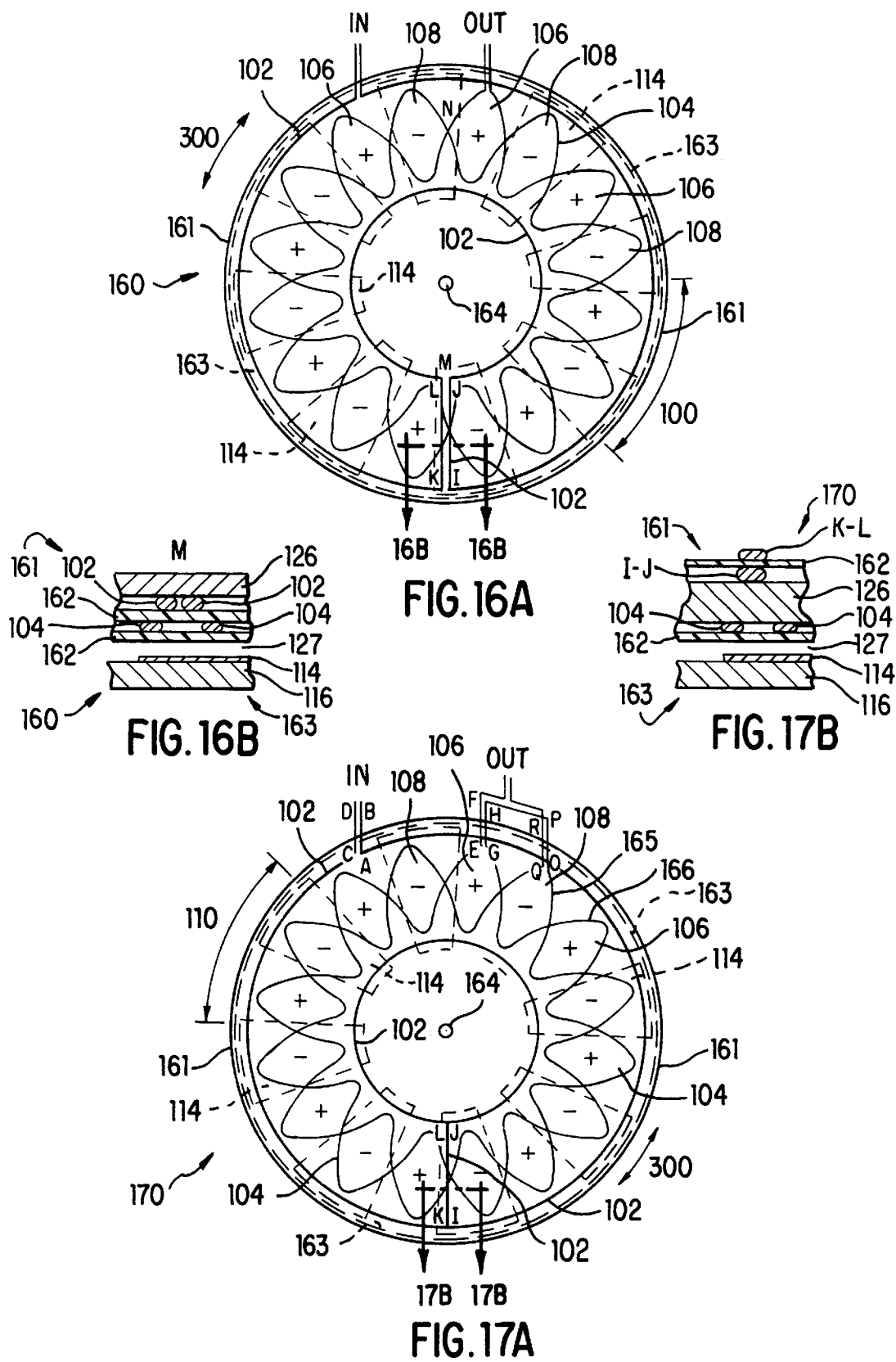

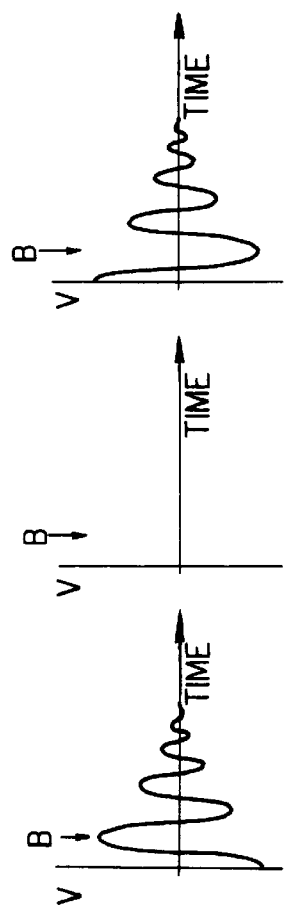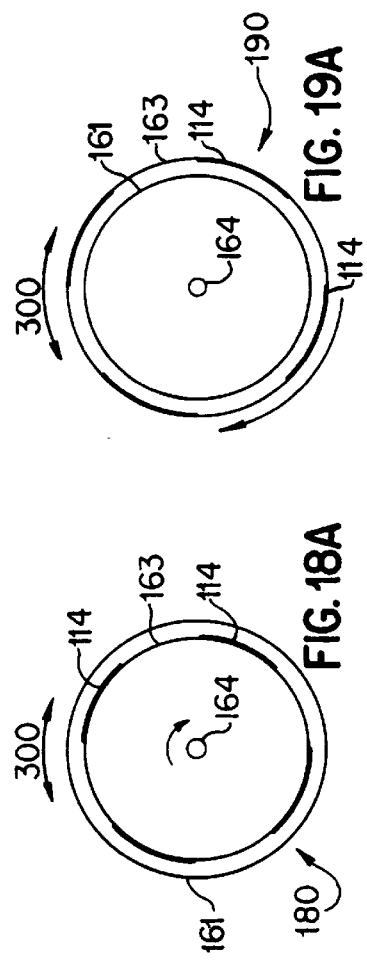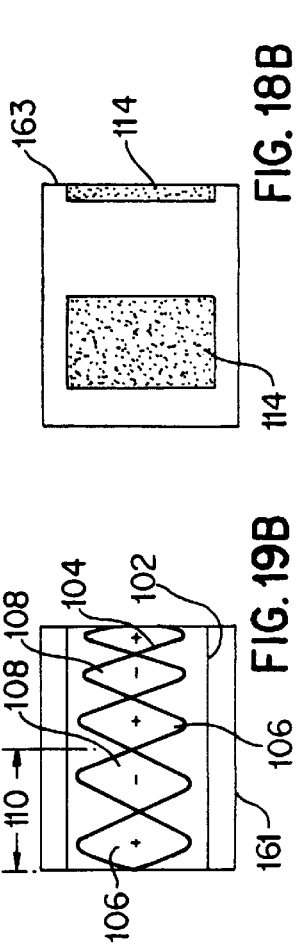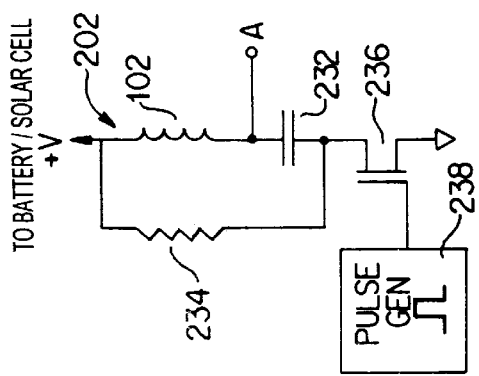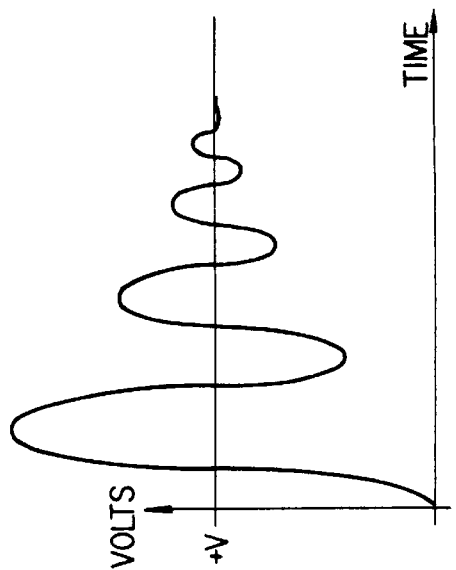

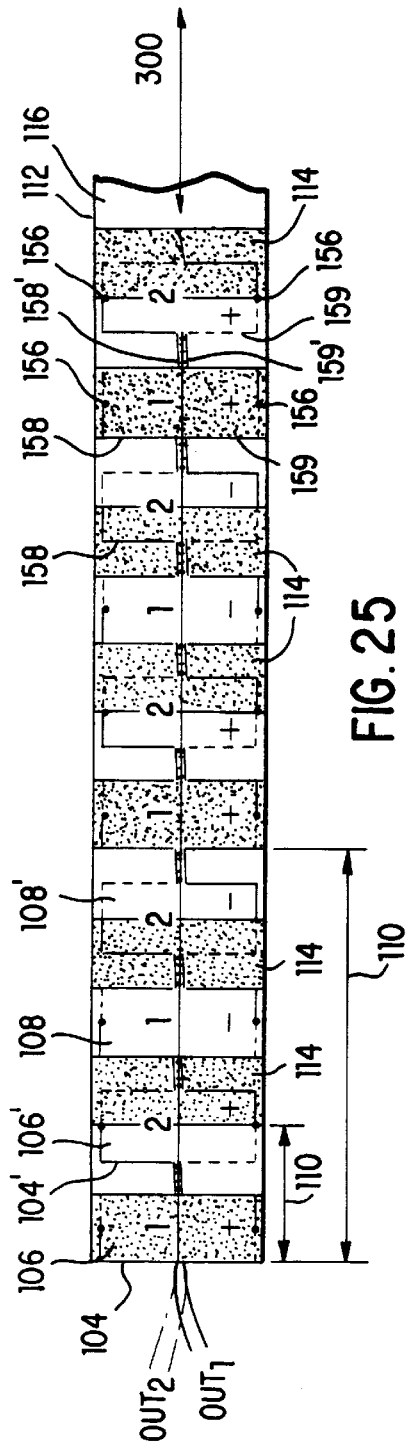
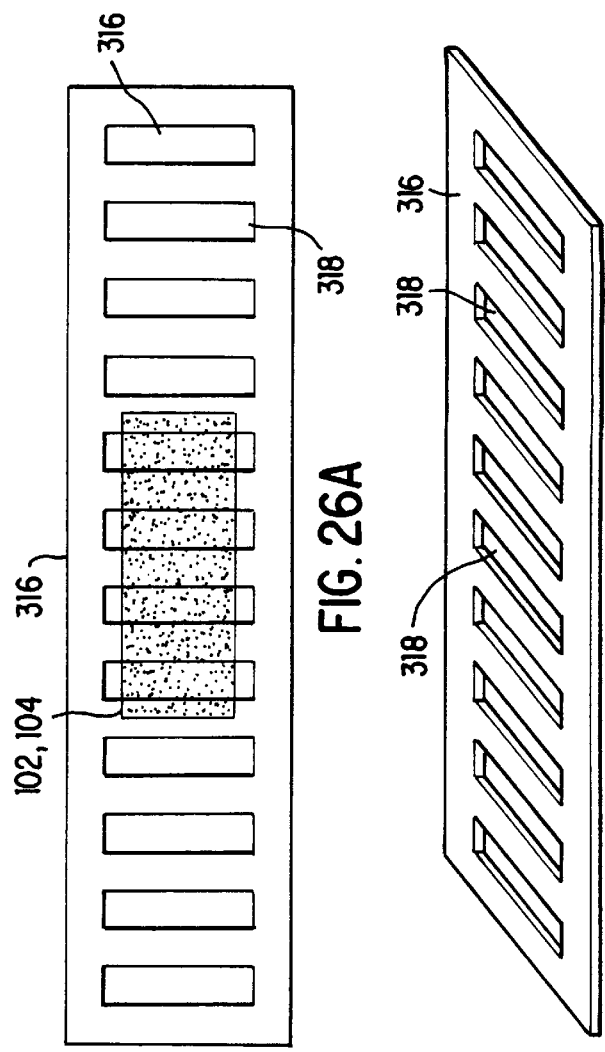
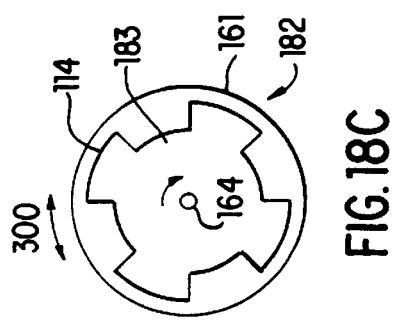

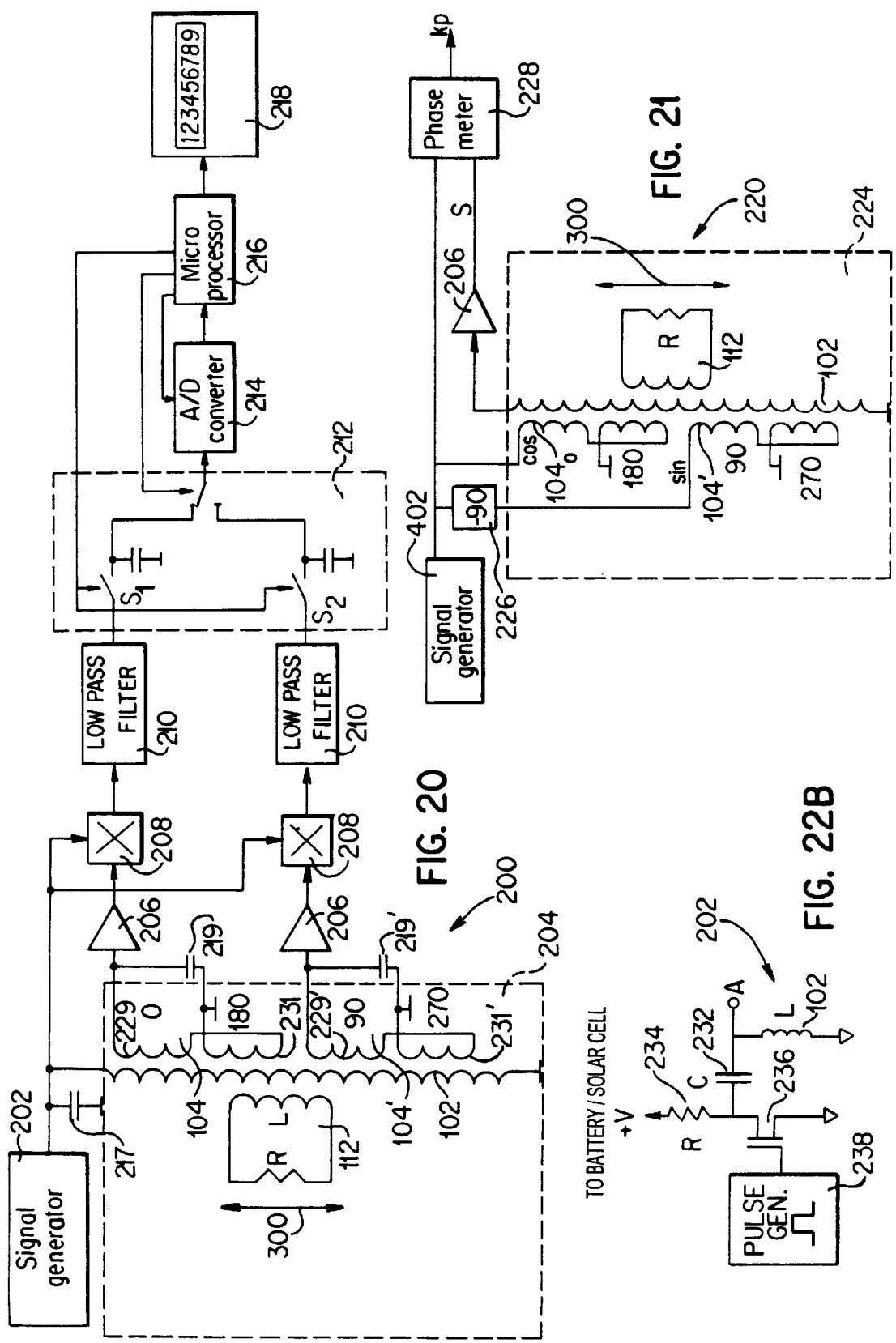

6,011,389

INDUCED CURRENT POSITION TRANSDUCER HAVING A LOW POWER ELECTRONIC CIRCUIT

This is a Continuation of application Ser. No. 08/441,769 filed May 16, 1995, now abandoned.

TECHNICAL FIELD

This invention relates to sensing movement or position between two members by means of current signals induced by magnetic fields.

BACKGROUND OF THE INVENTION

Various movement or position transducing systems are currently available. Most of such transducers are able to sense linear, rotary or angular movement. Optical transducers usually consist of a scanning unit and a glass scale having a grating applied thereto. The scanning unit generally includes a light source, a condenser lens for collimating the light, a scanning reticle with index gratings, and a photodetector. The scale is moved relative to the scanning unit and the lines of the scale coincide alternatively with lines or spaces in the index grating producing periodic light fluctuations. The periodic fluctuations of light intensity are converted by the photodetector into electrical signals that are processed to determine position. Optical transducers can provide position measurements with very high accuracy, particularly if laser light sources are used.

Currently, to improve efficiency, most manufacturers prefer using hand-held encoders and other measurement tools on the workshop floor, rather than in contaminant-free inspection rooms. Optical transducers, however, are sensitive to contamination, and are therefore impractical for use in most manufacturing or shop environments. Therefore, expensive and sometimes unreliable environmental seals or other methods of encapsulating the optical transducer are required to keep dust and oils from reaching the transducer. Furthermore, the light source often requires a fairly large current, thus making optical transducers unsuitable for use in battery-powered measuring tools (e.g., hand-held encoders).

Capacitive transducers draw very little current and are therefore well suited for use in battery-powered measurement tools. Capacitive transducers operate under a parallel plate capacitor model. Transmitter and receiver plates are positioned in a stationary member, and are coupled to appropriate voltage generating and read circuitry, respectively. These plates form one plate in the parallel plate capacitor model. The other plate is supplied by a moveable member or scale that includes many spaced-apart plates. As the scale is moved relative to the stationary member, the transmitter and receiver plates capacitively intercouple through each plate in the scale that passes therebetween. The read circuitry detects changes in voltage in the receiver plate as the plates in the scale are moved.

Capacitive transducers, however, require a small gap between the plates in the stationary member and the plates in the scale. The small gap requires tight tolerances, resulting in increased manufacturing costs. Additionally, capacitive transducers are sensitive to contamination, particularly dielectric fluids such as oils. Therefore, as with optical transducers, expensive and unreliable seals are required.

Magnetic transducers are insensitive to contaminations caused by oil, water and other fluids. Magnetic transducers (e.g., Sony Magnescale encoders™) employ a read head that detects magnetic fields and a ferromagnetic scale that is selectively magnetized with periodic, magnetic patterns. The read head senses magnetic field changes in the magnetic scale pattern as the scale is moved, and thereby determines position. Magnetic transducers are affected by small particles, particularly ferromagnetic particles, which are attracted to the magnetized scale. Consequently, magnetic transducers, as with capacitive and optical transducers, must be sealed, encapsulated or otherwise protected to prohibit dust from diminishing their effectiveness.

Inductive transducers are insensitive to cutting oil, water or other fluids and are insensitive to dust, ferromagnetic particles, and so forth. Inductive transducers (e.g., INDUCTOSYN® type transducers) employ multiple windings on one member, such as a series of parallel hairpin turns repeated on a printed circuit board, which transmit a varying magnetic field that is received by similar windings on another member. An alternating current flowing in the windings of the first member generates the varying magnetic field. The signal received by the second member varies periodically with the relative position between the two members, and therefore the relative position therebetween can be determined by appropriate circuitry. Both members, however, are active, and therefore must be electrically coupled to their respective circuitry. Electrically coupling both members increases manufacturing and installation costs. Furthermore, in the case of rotary encoders, the moving member must be connected via slip rings which increase the cost and decrease the reliability of the encoder.

Several patents of which the inventors are aware attempt to provide a motion or position transducer that is insensitive to contaminants, yet which can be more inexpensively manufactured than optical, capacitive, magnetic or inductive transducers. U.S. Pat. Nos. 4,697,144, to Howbrook, 5,233,294, to Dreoni, and 4,743,786, to Ichikawa et al., and British Patent Application No. 2,064,125, to Thatcher, show position detection devices that sense position between an inactive or unenergized member and an energized member (e.g., between a permanent magnet and a read circuit). While the transducing systems described in these patents eliminate electrical intercoupling between the two moving members (a drawback of inductive transducers), these systems generally fail to provide the high accuracy of prior transducers (e.g., optical or inductive encoders). Additionally, the inactive member in these transducing systems is preferably ferromagnetic so as to produce a strong magnetic field, or is moved within a defined and concentrated magnetic field generated by the active member. Also, the transducing systems under these patents produce discontinuous output signals, which causes inaccurate readings over extended positions or distances. Furthermore, the transducing systems under these patents are generally inapplicable for a wide variety of applications, such as in hand-held measurement tools or as linear, rotary, angular and other types of position transducing applications.

Overall, the inventors are unaware of a motion or position transducer system that is (1) insensitive to contaminants such as oil and ferromagnetic particles, (2) suitable for a wide variety of applications, (3) accurate, and (4) relatively inexpensive to manufacture as compared to prior transducers. A transducing system providing at least these four benefits has until now been unavailable.

SUMMARY OF THE INVENTION

According to principles of the present invention, an inductive transducer system for use in high accuracy applications (e.g., on the order of 10 $\mu$m or better resolution and accuracy for displacement at the read head), such as in linear or rotary encoders, employs two members moveable relative to each other. A first, active member induces eddy currents in a second, passive member (i.e., a member lacking any external power or electrical wires connected thereto). The first member contains both an active transmitter for generating a magnetic field and a passive receiver for receiving the field. The second, passive member influences the received field depending on its position relative to the first member. Electronic circuitry coupled to the transmitter and receiver evaluate the relative position between the two members, and outputs the relative position on a display.

The inductive transducer of the present invention may be readily and inexpensively manufactured by using, e.g., printed circuit board technology. The gap between the first and second members can be quite large, thus decreasing manufacturing tolerances and thereby making the transducer even more inexpensive to manufacture. Furthermore, the transducer of the present invention is insensitive to contamination by particles, including ferromagnetic particles, and oil, water, or other fluids. As a result, the transducer can be manufactured without expensive environmental seals and still be used in most shop environments. A pulse-driven drive circuit under the present invention allows the inductive transducer to consume little power, and thus may be readily incorporated into hand-held, battery-powered measurement tools.

In a broad sense, the present invention embodies a motion or position transducing system comprising a magnetic field source that preferably includes a first path of conductive material producing a changing magnetic field. At least one flux disrupter of an electrically conductive material is positioned within the magnetic field and disrupts the magnetic field proximate to the disrupter. A sensing conductor within a thin zone is arranged to form a prescribed periodic pattern of flux-receiving area along a measuring axis and within the magnetic field or flux, so as to passively generate an EMF across at least one output of the sensing conductor in response to the changing magnetic flux. The flux disrupter and the periodic pattern of the sensing conductor are moveable relative to each other from a first position where a first portion of the periodic pattern overlaps the flux disrupter, to a second position where the second portion of the periodic pattern overlaps the flux disrupter, such that the flux disrupter varies the EMF from the first position to the second position. The flux disrupter acts cooperatively with the periodic pattern of the sensing conductor to produce a continuously varying periodic EMF across the output of the sensing conductor in response to a continuous relative motion between the flux disrupter and the periodic pattern of the sensing conductor in the direction of the measuring axis.

The sensing conductor is preferably formed as a plurality of first and second alternating loops of a conductive material are arranged within the magnetic field. Each of the first and second loops produces first and second signal components, respectively, in response to the magnetic field. The first and second loops and the disrupter are movable with respect to each other. In a first position, the first loops may be proximate to the disrupters so as to alter the first signal component. In a second position, the second loops may be proximate to the disrupters so as to alter the second signal component. The first and second signal components indicate the position of the first and second loops relative to the disrupter.

The present invention also embodies a position transducing system having a first path of conductive material that produces a magnetic field. The first path is substantially straight and approximately parallel to a measuring axis. At least one disrupter of an electrically conductive material is positioned within the magnetic field and disrupts a portion of the magnetic field that is proximate to the disrupter. A second path of conductive material is arranged within the magnetic field. The second path is positioned approximately parallel to the measuring axis and has spatial variations along the second path. The spatial variations include a first portion of a second path proximate to the first path, and a second portion of the second path, that is less proximate to the first path than the first portion. The second path produces a single continuous output signal in response to the magnetic field. The second path, and the disrupter, are moveable with respect to each other from a first position where the first portion of the second path is proximate to the disrupter to a second position where the second portion is proximate to the disrupter. The second path and the disrupter are moveable with respect to each other so as to alter the single output signal. The single output signal is indicative of the position of the first and second portions of the second path relative to the disrupter.

The present invention solves problems inherent in the prior art by providing a high accuracy transducing system that is insensitive to contaminants such as oil and particles, suitable for a wide variety of applications, accurate, and relatively inexpensive to manufacture as compared to prior transducers. Other features and advantages of the present invention will become apparent from studying the following detailed description of the presently preferred embodiment, together with the following drawings.

BRIEF DESCRIPTION OF THE DRAWINGS

FIG. 16A is a plan view showing a layout of a rotary encoder under the present invention.

FIG. 16B is an enlarged cross-sectional view of the rotary encoder taken along the line 16B—16B of FIG. 16A.

FIG. 17A is a plan view showing the layout of a first alternative embodiment of the rotary encoder of FIG. 16A.

FIG. 17B is an enlarged cross-sectional view of the first alternative rotary encoder taken along the line 17B—17B of FIG. 17A.

FIG. 18A is a top plan view of a rotary, cylindrical encoder under the present invention.

FIG. 18B is a side elevational view of a rotor for the rotary, cylindrical encoder of FIG. 18A.

FIG. 18C is a top plan view of a first alternative embodiment of the rotary, cylindrical encoder of FIG. 18A.

FIG. 19A is a top plan view of a second alternative embodiment of the rotary, cylindrical encoder of FIG. 18A.

FIG. 19B is a side elevational view of the stator of the rotary, cylindrical encoder of FIG. 19A.

FIG. 20 is a partial block, partial schematic view of encoder electronics for use with the inductive encoder of the present invention.

FIG. 21 is a partial block, partial schematic view of a first alternative embodiment of the circuitry of FIG. 20.

FIG. 22A is a partial schematic, partial block diagram of the signal generator of FIG. 20.

FIG. 22B is a partial schematic, partial block diagram of an alternative embodiment of the signal generator of FIG. 22A.

FIG. 23 is a waveform diagram showing a plot of time versus voltage for a resonant signal output from the signal generator of FIG. 22A.

FIG. 24A is a waveform diagram showing a plot of time versus voltage for a signal output from the read head of FIG. 1, when driven by the circuits of FIGS. 22A or 22B, and when the scale of FIG. 2 is positioned to provide a maximum output.

FIG. 24B is a waveform diagram showing a plot of time versus voltage when the relative position of the scale of FIG. 2 has been moved one-quarter wavelength from the position of FIG. 24A.

FIG. 24C is a waveform diagram showing a plot of time versus voltage when the relative position of the scale of FIG. 2 has been moved one-half wavelength from the position of FIG. 24A.

FIG. 25 is a plan view showing a layout of a fifteenth alternative embodiment of the read head of FIG. 1, which overlays the scale of FIG. 2.

FIG. 26A is a partial schematic, partial block diagram of a fourth alternative embodiment of the scale of FIG. 2, which underlies a block representing the read head of FIG. 1.

FIG. 26B is an isometric view of the scale of FIG. 26A.

DETAILED DESCRIPTION OF THE PRESENTLY PREFERRED EMBODIMENT

The inductive transducer of the present invention operates under the principle that a changing magnetic field sets up circulating currents, known as eddy currents, in a piece of metal or other conductive material placed within the field. For example, if an electrically conductive slab of metal is placed between the pole faces of an electromagnet, and if the magnetic field between the pole faces changes with time (e.g., when the electromagnet is driven by an alternating current), the flux through any closed loop in this slab will change. As a result, an electromotive force ("EMF") is induced around the closed loop. Since the slab is a conductor, an eddy current is generated whose value equals the EMF divided by the resistance of this slab along the loop. Such eddy currents are often produced in the magnetic cores of transformers. In transformers, such eddy currents are unwanted because they result in power loss and create heat which must be dissipated.

Figure 1:
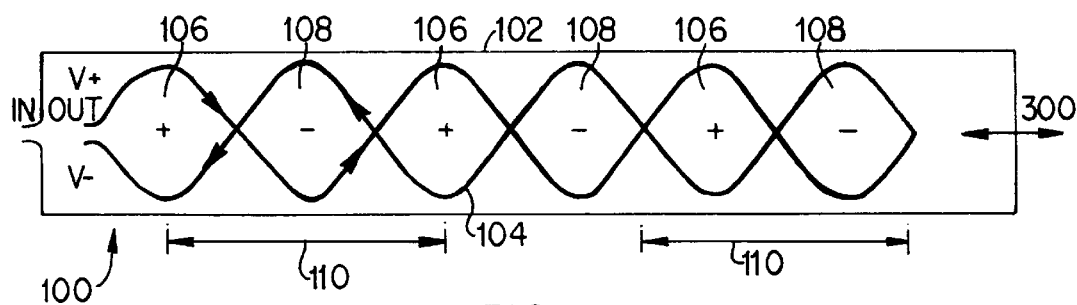
FIG. 1 is a plan view showing a layout of transmitter and receiver windings for a read head for an inductive transducer under the present invention.

In the present invention, the existence of eddy currents has been applied to provide a beneficial result. FIG. 1 shows a transducing unit, or read head 100, which is an electronically connected member of the inductive transducer under the present invention. A measuring axis 300 is defined in FIG. 1, and the following figures, for clarity of description. References to "length" herein generally refer to dimensions extending parallel to the measuring axis; references to "width" generally refer to dimensions extending perpendicular to the measuring axis, and in the plane of the read head. The read head 100 consists of at least two substantially coplanar paths of wire or windings. A transmitter winding 102 forms a large planar loop. A receiver winding 104, substantially in the same plane as the transmitter winding 102, consists of a plurality of immediately adjacent alternating loops arranged in a helical pattern along the receiver winding. The receiver winding 104 is laid out in one direction as indicated by the arrows in a zig-zag or sinusoidal pattern, and then in a reverse direction as indicated by the arrows so that the winding crosses over itself to form alternating loops 106 and 108 interposed between each other, as shown in FIG. 1. Alternatively, the loops 106 and 108 can be created by taking a large loop of wire and twisting the wire clockwise or counter-clockwise 180 degrees at regular portions along the large loop. The present invention produces a smoothly continuous signal output versus position function, as described below. Such a smoothly continuous function is one feature enabling the present invention to be used for very high accuracy measurement, while retaining relatively simple signal processing requirements.

As a result, each of the alternating loops 106 and 108 of the receiver winding 104 have a different winding direction as compared to its adjacent loops. By applying an alternating current to the transmitter winding 102, the transmitter winding produces a varying magnetic field encircling itself and extending perpendicular to, and substantially invariant along the length of, the plane of the receiver winding 104. The time-varying magnetic field, extending perpendicular through the loops 106 and 108 of the receiver winding 104, generate an EMF in, or time-varying current through, the receiver winding. Since the loops 106 and 108 are oriented in alternating directions, the varying magnetic field generates EMF, or current, in alternating directions between adjacent loops 106 and 108, represented by the "+" and "−" symbols in FIG. 1. Each of the loops 106 and 108 formed in the receiver winding 104 substantially enclose preferably the same area within the plane. Therefore, if the number of "+" loops 106 equals the number of "−" loops 108 in the receiver winding 104, and the receiver winding receives a magnetic flux which is substantially invariant along its length then the varying magnetic field induces a net zero EMF in the receiver winding. Restating, the total time-varying current generated in a clockwise direction by the "+" loops 106, for example, equals and cancels out the total time-varying current generated in a counterclockwise direction by the "−" loops 108.

If a conductive object is moved close to the read head 100, the varying magnetic field generated by the transmitter winding 102 will induce eddy currents in the conductive object, which in turn sets up a magnetic field from the object that counteracts the varying transmitter magnetic field. As a result, the magnetic flux that the receiver winding 104 receives is altered or disrupted, thereby causing the receiver winding to output a non-zero EMF signal. Consequently, a voltage measured at output terminals $V^+$ and $V^-$ of the receiver winding 104 will change polarity as the conductive object moves between the "+" and "−" loops 106 and 108.

The distance measured between two loops, or between one-half of one loop up to one-half of a similar loop (e.g., the half of loop 106 through loop 108 to the next half of loop 106) is defined as a pitch or wavelength 110 of the transducer. If a conductive object is moved along the read head 100, the varying magnetic field from the transmitter winding will generate eddy currents in the object. Such eddy currents generate reverse magnetic fields that attenuate the transmitter magnetic field proximate to the object. If the object is proximate to the receiver winding 104 and is positioned along the measuring axis 300, the AC amplitude of the signal output from the receiver winding will vary continuously and periodically with the wavelength 110 due to the periodic alteration of the loops 106 and 108 and local disruption of the transmitted magnetic field caused by the object. The signal output from the receiver winding 104 preferably has a smooth, continuous, sinusoidal shape in response to movement of the object with respect to the receiver winding. Such a continuous receiver output signal results from the loops 106 and 108 being immediately adjacent to each other, or when such loops are in cooperation with each other and the disrupter spacing as explained below with respect to FIG. 25. A continuous signal provides accurate position readings over extended distances along the measuring axis 300.

If the object is of a length equal to the wavelength 110, then it will disrupt the transmitter magnetic field over equal areas of loops 106 and 108. As a result, the amplitude of the signal output from the receiver winding 104 will be nominally zero and insensitive to position of the object relative to the loops 106 and 108. No useful signal results, and thus, the disruptive object is preferably not equal to the wavelength 110. The object could, in general, be close to an odd number of half wavelengths long, but would not, by being longer than half a wavelength, produce a stronger signal, because the part of the object's length that corresponds to an even number of wavelengths does not contribute to the signal.

If the object's length is not equal to wavelength 110, then in most positions, unequal areas of the loops 106 and 108 will be disrupted, and the signal output will be sensitive to position of the object relative to the loops. If the object is much smaller or larger than the loops 106 and 108, then the amplitude of the signal output will be weak and high accuracy will be difficult to obtain. The signal output will have a large amplitudes and thus be most sensitive to position of the objects when the object is of a length equal to about half the wavelength 110 (i.e., when it is possible for the object to be positioned coincident with the loops 106 or 108 exactly). Consequently, the present invention preferably employs conductive objects that have a length equal to one half the wavelength 110.

The loops 106 and 108 of the receiver winding 104 are preferably placed at a selected distance from the transmitter winding 102. Experimentation has shown that the transmitter winding 102 produces a magnetic field having an intensity that rapidly diminishes as a function of the distance from the transmitter winding. However, experimentation has also shown that at a certain distance from the transmitter winding 102, the magnetic field tends to level off or become approximately uniform. The distance at which the magnetic field becomes uniform is a function of the geometry of the winding. Consequently, to improve accuracy of the inductive transducer of the present invention, the loops 106 and 108 of the receiver winding 104 are preferably located proximate to the transmitter winding 102, but at a distance where the magnetic field becomes more uniform.

Figure 2:
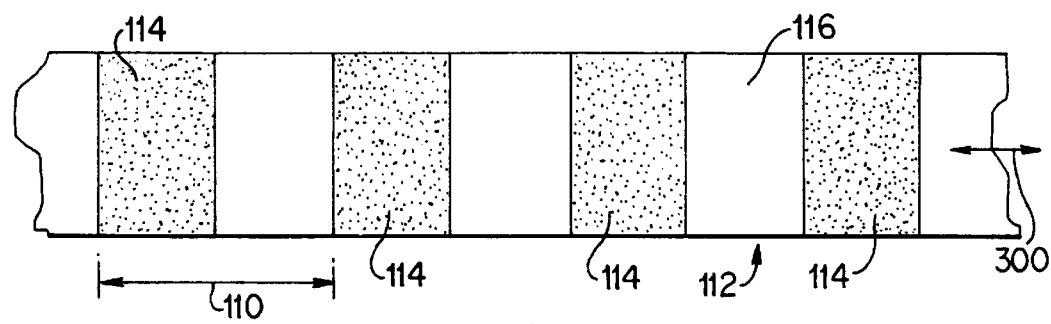
FIG. 2 is a plan view showing a portion of a layout of a scale for use with the read head of FIG. 1 for the inductive transducer.
Figure 3A:
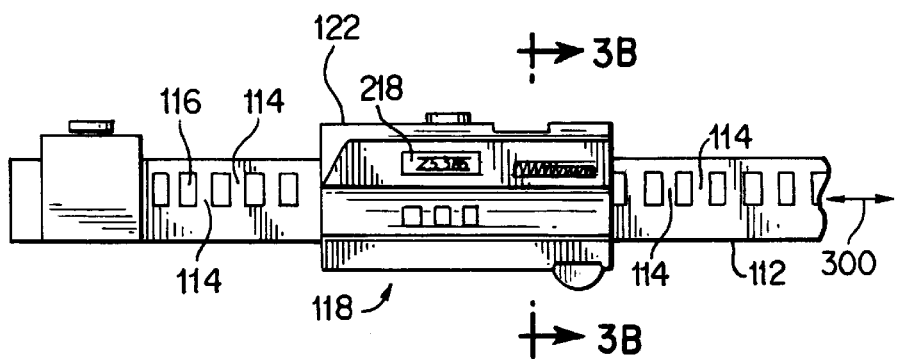
FIG. 3A is a plan view showing a hand-held encoder for use with the read head and scale of FIGS. 1 and 2.

For a linear encoder using the inductive transducer of the present invention, a passive, usually non-moving member or scale 112 includes multiple flux disrupters or electrically conductive plates 114 received by a supporting member or substrate 116, all of substantially planar construction, as shown in FIG. 2. The conductive plates 114 are preferably highly electrically conductive, but are non-magnetic, so that they do not attract ferromagnetic particles. The plates 114 preferably have a length equal to one-half of the wavelength 110 and are arranged on a pitch of one wavelength. If the length of scale 112 exceeds the length of the read head 100, then the length of the scale 112 defines the measurement range for the linear encoder. The scale 112 can be used in a hand-held encoder system 118, as shown in FIG. 3A. The hand-held encoder 118, discussed more fully below, includes the scale 112 and a transducing unit housing 122 for receiving the read head 100.

An accurate balancing and alternate interspersing of "+" and "−" loops 106 and 108 to achieve a nominal zero output in the absence of disrupters, while at the same time providing for a continuous signal at each output, is one key element in achieving a high signal-to-noise ratio in the present invention, and thus enabling high accuracy measurement. Consequently, improved accuracy in the present invention depends on the specific read head 100 and scale 112 design principles and geometry disclosed herein. Additionally, the particular design principles and geometries disclosed herein largely eliminate effects from non-uniform transmitter fields along the width of the read head (perpendicular to the measuring axis 300), and reject externally applied fields as "common-mode" errors, due to the balanced "differential detection" of the present inductive transducer. The degree of accuracy in the present inductive transducer depends largely on the care in design and construction of the read head 100 and scale 112, as is recognized from the detailed description herein.

Figure 4A:
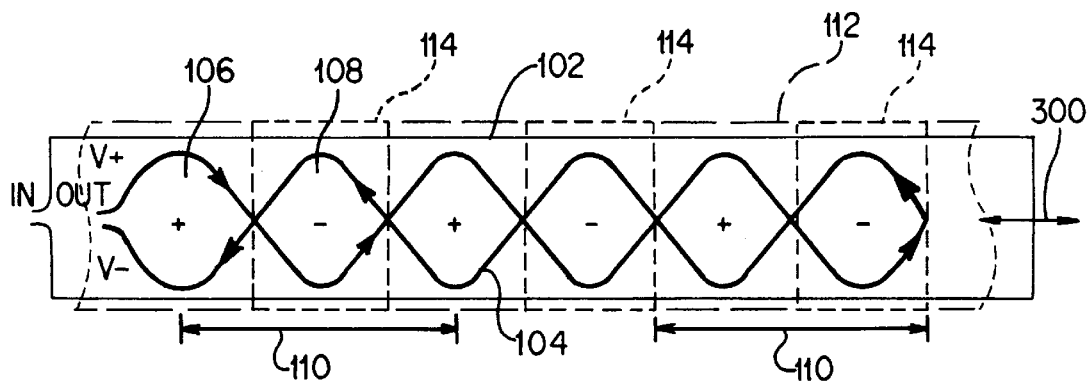
FIG. 4A is a plan view showing the read head of FIG. 1 overlaying the scale of FIG. 2 so as to intercouple the scale with a portion of the read head.
Figure 4B:
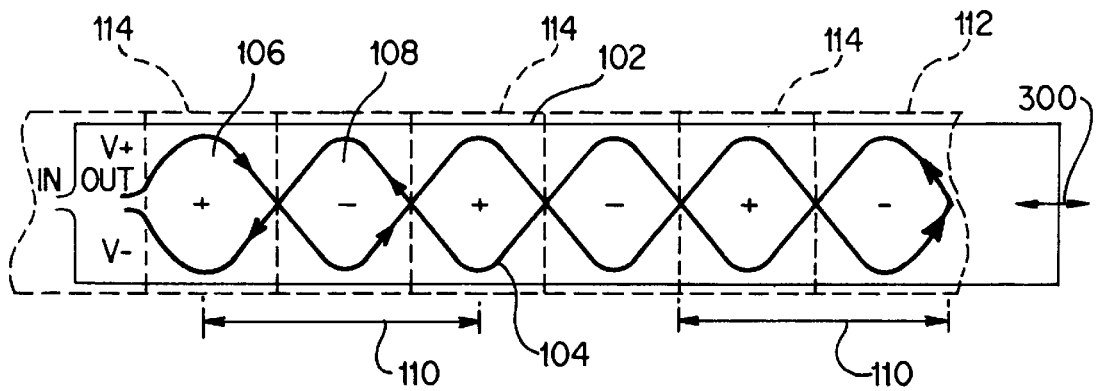
FIG. 4B is a plan view showing the read head of FIG. 1 overlaying the scale of FIG. 2 so as to intercouple the scale with another portion of the read head.
Figure 4C:
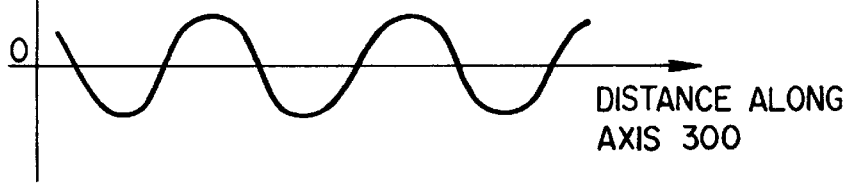
FIG. 4C is a waveform diagram showing a plot of output signal and polarity of the read head versus position of the scale for the transducers of FIGS. 4A and 4B.

FIGS. 4A, 4B and 4C show an example of how linear encoders employing the inductive transducer of the present invention operate. As the scale 112 and its plates 114 (shown in dashed lines) move with respect to the transmitter and receiver windings 102 and 104, the bars alternatively cover or are placed in proximal relation to all of the "+" loops 106 or all of the "−" loops 108. As shown in FIG. 4A, the plates 114 are proximate to, or "overlap," all of the "−" loops 108 in the receiver winding 104. As the transmitter winding 102 inductively couples to, and induces eddy currents in, the plates 114, the plates produce a magnetic field that counteracts the transmitter magnetic field passing through the "−" loops 108. The "−" loops 108, therefore, generate less induced EMF than the "+" loops 106, which fully receive the flux from the transmitter magnetic field. Consequently, in this example, the receiver winding 104 produces a net "positive" polarity EMF, current, or voltage, at its output. The output signal varies with time because the transmitter winding 102 generates a time-varying magnetic field. The amplitude and polarity of the time varying output signal, relative to the input signal, provides an indication of position between the read head 100 and the scale 112. FIG. 4C shows an example of how the output amplitude varies with the position of the scale 112 relative to the read head 100. The initial peak in the waveform of FIG. 4C is an example of a "positive polarity" amplitude output from the $V^+$ and $V^-$ terminals of the receiver winding 104 of FIG. 4A. "Polarity" indicates the time phase of the time-varying output signal relative to the input signal; it will either be in phase or inverted (180° out of phase) relative to the input signal.

Alternatively, as shown in FIG. 4B, as the scale 112 is moved so that the plates 114 overlap the "+" loops 106, the induced current generated in the bars counteracts the flux of the transmitter magnetic field passing through the "+" loops 106. As a result, the "−" loops 108 generate more induced EMF than the "+" loops 106. Consequently, the receiver winding 104 generates a net "negative" polarity EMF, current or voltage at its output. The initial valley in the waveform of FIG. 4C shows an example of a negative polarity amplitude output from the $V^+$ and $V^-$ terminals of the receiver winding 104 of FIG. 4B.

When the plates 114 completely overlap the "−" loops 108 as shown in FIG. 4A, the resulting output signal has a maximum positive amplitude as shown in the peaks in the waveform of FIG. 4C. Conversely, when the plates 114 completely overlap the "+" loops 106 as shown in FIG. 4B, the resulting output signal has a maximum negative amplitude as shown in the valleys in the waveform of FIG. 4C. As the plates 114 move along the measuring axis 300 from the position shown in FIG. 4A to the position shown in FIG. 4B, the amplitude of the waveform of FIG. 4C decreases to a zero value when the plates overlap exactly half of the area of each of the "+" and "−" loops 106 and 108. Thereafter, as the plates 114 move more closely to the position shown in FIG. 4B, the amplitude of the receiver output signal has an increasing negative value.

Appropriate circuitry (as discussed below) coupled to the $V^+$ and $V^-$ terminals of the receiver winding 104 samples the changes in the signal output from the receiver winding 104 (either voltage or current changes) and thereby computes linear distance along the scale 112 of this induced current position transducer application.

The linear scale 112, read head 100, or other encoding implementations of the present invention may be readily manufactured by conventional techniques. For example, known printed circuit board techniques (on rigid or flexible substrates) can be used to manufacture the read head 100 by forming transmitter and receiver windings 102 and 104 on the printed circuit board substrate. Appropriate insulation is necessary at transition points between the loops 106 and 108 where the receiver winding 104 crosses over itself, in order to prevent short circuiting of the receiver winding at the transition or cross-over points.

The scale 112 can similarly be manufactured using known printed circuit board techniques, where the plates 114 are thin copper foil bars deposited onto the printed circuit board substrate 116. Other high conductivity materials besides copper can be used for the plates 114, such as aluminum, chromium, silver or gold. Typical printed circuit boards use a glass fiber reinforced plastic (e.g., FR4 material). The dimensional stability (e.g., thermal expansion/contraction) of the scale 112 effects the overall accuracy of the present invention. Therefore, for high accuracy applications, more stable scale substrates 116 are preferred, such as glass, quartz, steel, invar, or ceramics. Steel and invar are conductive materials, however, their conductivity is much smaller than that of copper. Therefore the conductivity contrast between the copper plates 114 and the steel or invar substrate 116 would provide sufficient contrast for the receiver winding 104 to produce a varying output as the scale 112 moves with respect to the read head 100. In some applications, it may be useful to laminate or adhere one or more plates 114 to a flexible metal tape as the substrate 116, where the plates are of a metal dissimilar from the metal of the flexible tape. For instance, the metal tape having the plates 114 adhered thereto can be mounted to a fixture whose position is to be measured. Alternatively, the metal tape can be retracted or coiled so as to store the portion of the metal tape not currently active in a given measurement process.

The plates 114 can be deposited on a printed circuit board 116, whose dimensional stability is improved by affixing it to a steel or other dimensionally stable substrate or support. For example, as shown substantially in FIG. 3B, the printed circuit board substrate 116, having copper plates 114 deposited thereon, is glued to a steel support 124. In the configuration shown, the printed circuit board substrate 116 is affixed to the steel support 124 so that the copper plates 114 rest against an upper surface of the steel support. As a result, the printed circuit board substrate 116, a non-conductive material, prevents the transmitter and receiver windings 102 and 104 from electrically shorting. The printed circuit board substrate 116 also prevents the copper plates 114 from abrading the transmitter and receiver windings 102 and 104. The printed circuit board substrate 116 is preferably very thin, so that a distance or gap 127 between the receiver winding 104 and the copper plates 114 is relatively small.

Figure 3B:
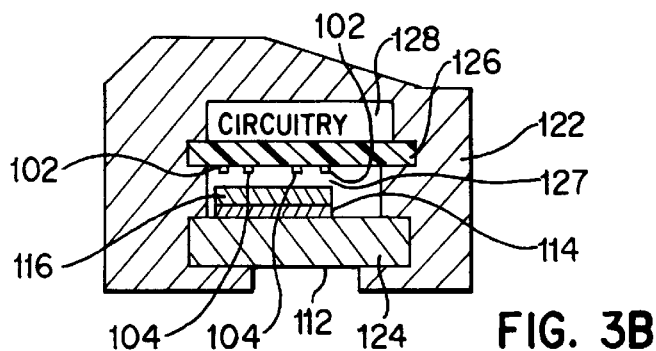
FIG. 3B is an enlarged cross-sectional view of the hand-held encoder taken along the line 3B—3B of FIG. 3A.

As shown in FIG. 3B, the transmitter and receiver windings 102 and 104 are similarly deposited on a mounting member or printed circuit board substrate 126. A protective layer of insulative material (not shown) may be applied over the transmitter and receiver windings 102 and 104 so as to protect them from abrasion and prevent them from electrically contacting other surfaces and each other. A reverse side of the printed circuit board substrate 126 retains the circuitry for driving the transmitter winding 102 and receiving the output signals from the receiver winding 104 (shown as block 128 and described more fully below). The hand-held encoder housing 122 retains the printed circuit board 126 and slidably retains the scale 112.

Figure 5A:
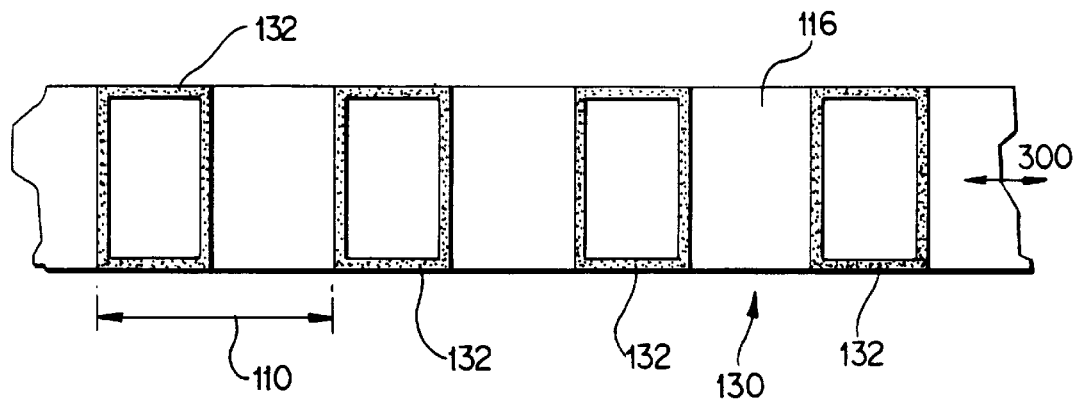
FIG. 5A is a plan view showing a portion of a layout of a first alternative embodiment of the scale of FIG. 2.

Tests have shown that rather than employing solid plates 114 in the scale 112, short circuited wire loops can be used. An alternative embodiment of the scale, using wire loops, is shown in FIG. 5A as scale 130. This alternative embodiment, and all other alternatives and alternative embodiments described herein, are similar to the first or previously described embodiments, and all elements are similarly numbered when of similar construction. Only the differences in construction are discussed in detail herein.

The scale 130 has short circuited wire loops 132 that can be readily deposited on the substrate 116. The short circuited loops 132 of the scale 130 produce secondary currents, instead of eddy currents, within the loops as a result of the varying transmitter magnetic field. The secondary currents produce magnetic fields that oppose the transmitter magnetic field. Therefore, the loops 132 are effective in canceling the flux through the loops 106 and 108 in the receiver winding 104 to thereby produce a changing output signal. Because the loops 132 thus function like eddy currents, for purposes of the description, such secondary currents are also referred to as eddy currents herein. Experimentation has shown that the solid plates 114 disrupt the flux through the loops 106 and 108, more than the short circuited loops 132. As a result, the signal strength from the receiver winding 104 is greater with solid plates 114, and they are therefore preferred under the present invention.

Other layouts for the disruptive elements besides plates 114 or loops 132 can be used under the present invention. Additionally, the supporting member 116 may can either be conductive or non-conductive, depending on manufacturing considerations, provided that the conductivity of the flux disrupters 114 is operably different from the conductivity of the supporting member 116. Alternatively, a monolithic metal member 116 can be used as the supporting member 116 and flux disrupters can be distinguished by processes which alter the grain structure, chemical composition, or mechanical integrity (i.e., cracks and mechanical discontinuities in the supporting member), or by adding or plating an additional metal layer of a different type on the supporting member.

Figure 5B:
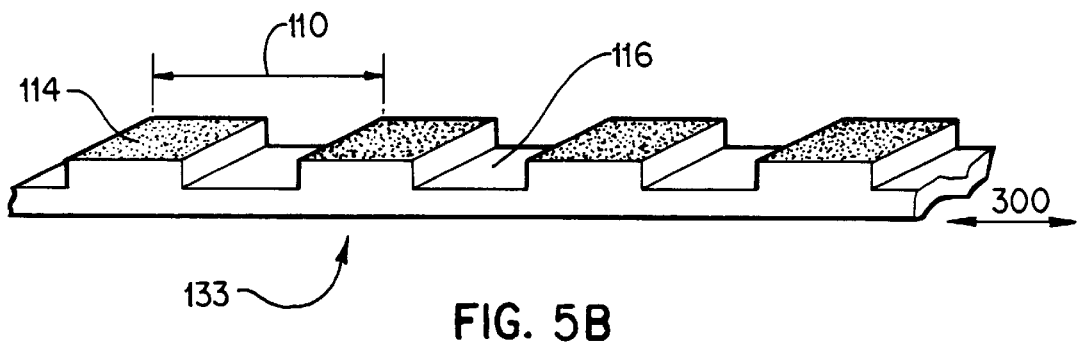
FIG. 5B is an isometric view of a portion of a second alternative embodiment of the scale of FIG. 2.

For example, a scale 133 shown in FIG. 5B includes disrupters 114 that are substantially of the same material as the supporting member 116. The disrupters 114 are formed as raised or protruding portions in the supporting member 116 by using, e.g., a surface contouring process. The disrupters 114 are distinguished from the supporting member 116 in the scale 133 by their proximity to the loops 106 and 108 when placed in relation to the read head 100. The closer proximity of the disrupters 114 from the supporting member 116 increases their disruptive effect from the supporting member, having an effect comparable to conductivity variation, and thus allowing the scale 133 to operate in a manner substantially similar to the scale 112.

Figure 5C:
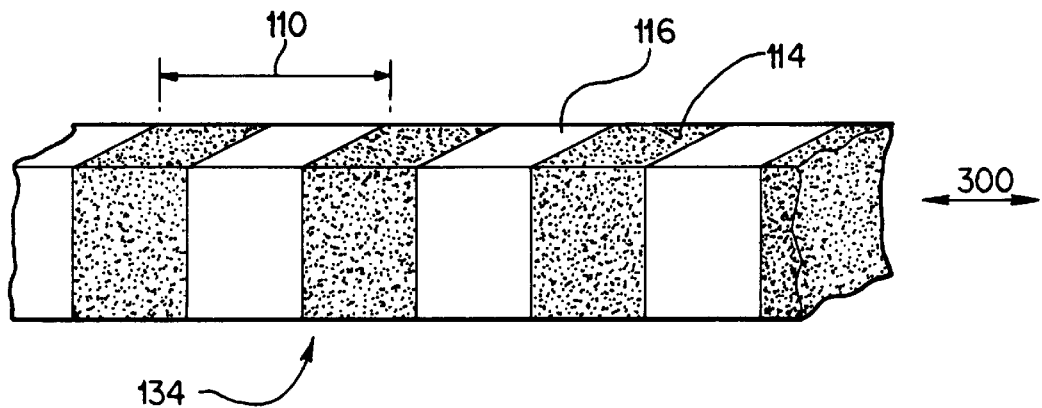
FIG. 5C is an isometric view of a portion of a third alternative embodiment of the scale of FIG. 2.
Figure 6A:
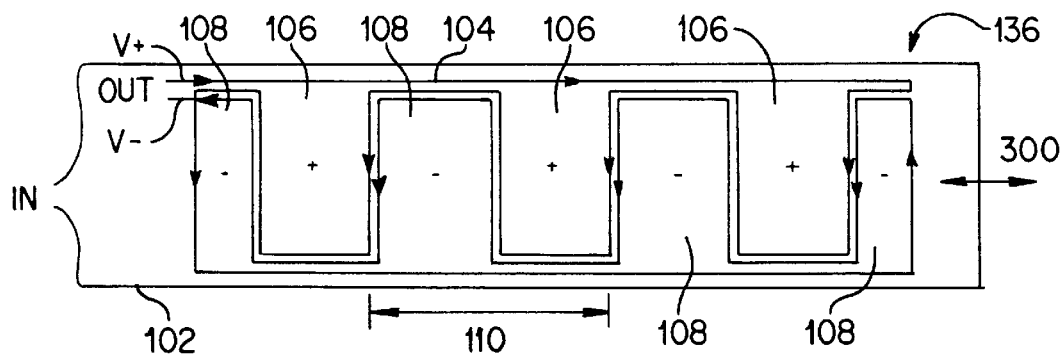
FIG. 6A is a plan view showing a layout of a first alternative embodiment of the read head of FIG. 1.
Figure 6B:
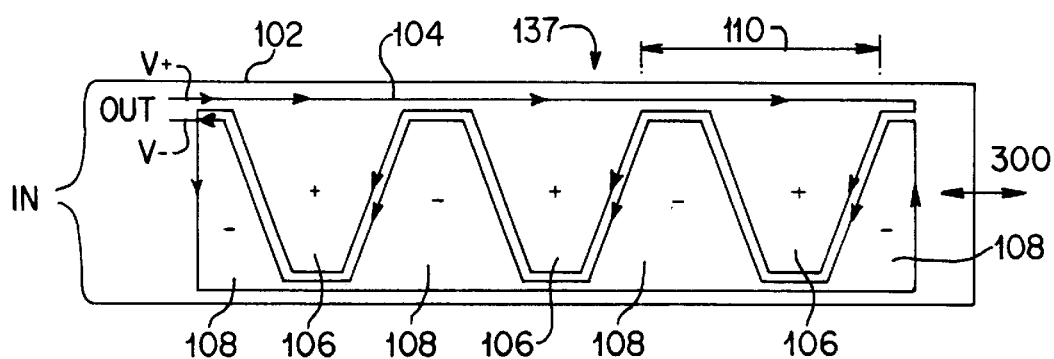
FIG. 6B is a plan view showing a layout of a second alternative embodiment of the read head of FIG. 1.
Figure 6C:
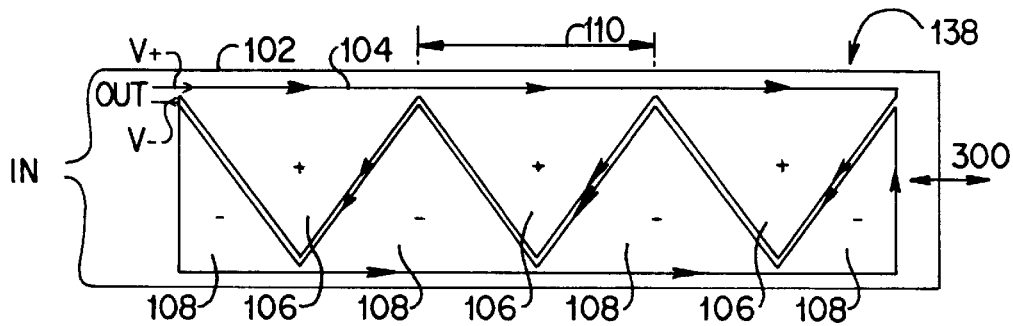
FIG. 6C is a plan view showing a layout of a third alternative embodiment of the read head of FIG. 1.
Figure 6D:
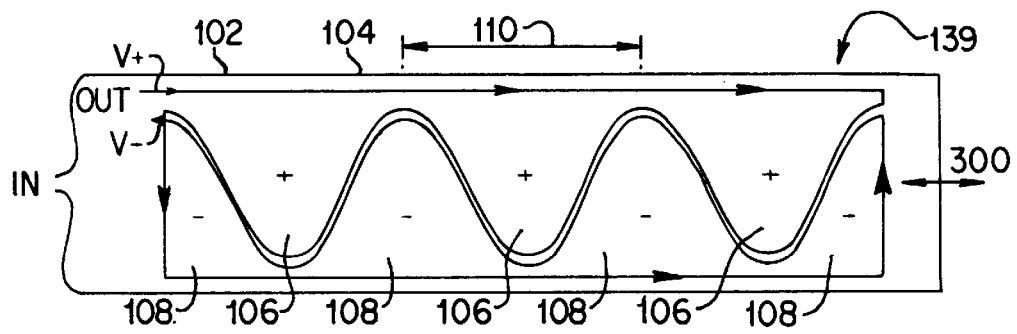
FIG. 6D is a plan view showing a layout of a fourth alternative embodiment of the read head of FIG. 1.

Alternatively, a scale 134 shown in FIG. 5C includes metallic laminations of alternating conductivity, or alternating conductive and non-conductive laminations. Plates 114 of a relatively more conductive material are defined by their exposed edges, and the support member 116 is a spacing and bonding member of a relatively less conductive material bonded between the plates 114 to form an alternating stack of material. In one special case of such a construction, the laminations 114 and 116 can be provided to form one operable element of a linear motor.

Other layouts or geometries for the receiver winding 104 can also be used while still producing adequate results under the present invention. FIGS. 6A, 6B, 6C and 6D show four different read head layouts 136, 137, 138 and 139, respectively. Each layout in FIGS. 6A through 6D show three periods of receiver windings 104. Arrows in FIGS. 6A through 6D indicate the winding direction within the receiver windings 104 of the respective read heads 136 through 139. Importantly, the receiver windings 104 produce a continuous output in response to movement of the disrupters and they are balanced, in that the magnetic field generated by the transmitter winding 102 causes the receiver windings to produce a net zero output signal in the absence of disrupters. An advantage of the read heads 136 through 139 is that they can be deposited as one layer on a printed circuit board substrate with a minimum of throughholes, and without an insulating layer for most of its area, since the windings do not cross over each other at each loop. Instead, there is only a single crossover requiring insulation or throughholes ("vias") at the input end of the receiver winding 104. The receiver winding 104 of the read head 100 (FIG. 1) requires crossovers on separate layers, and the separate layers must be electrically interconnected by means of vias between the layers at each loop. The number of layers and vias increase manufacturing costs. Therefore, the read heads 136 through 139 are cheaper to manufacture.

A disadvantage of read heads 136 through 139 is that misalignment of the read head by rotation about the measuring axis 300 of receiver windings 104 (e.g., roll misalignment) can position, for example, the "+" loops 106 closer to the scale 112 than the "−" loops, causing an unbalanced signal to be output and thus introducing a potential measurement error. The read head 136 having a rectangularly-shaped receiver winding 104, however, would likely be insensitive to such misalignments.

The receiver windings 136 through 139, as with the receiver winding 104, the scale 112 and the other scales and windings described herein, can be altered to change their size without substantially affecting the performance of the present invention. The signal output from the receiver winding 104, however, is weak compared to the strong magnetic field generated by the transmitter winding 102. Therefore, while the overall size of the read head may be changed, the area of the loops 106 and 108 should be accurately balanced so as to produce no signal offset, including practically zero noise signal. To compensate for manufacturing tolerances or other constraints tending to create a signal offset, the size and shape of the loops 106 and 108 can be altered so as to "tune" the output from the receiver winding 104. Also, if a certain sinusoidal position signal is desired, then the shapes and wavelengths can be selected to spatially filter the received fields and thus reduce harmonic distortions. Additionally, the term "loops" as used herein refers to any substantially enclosed area such as the circular, rectangular, trapezoidal, triangular, and sinusoidal areas enclosed as loops 106 and 108 in the receiver windings of FIGS. 1, 6A, 6B, 6C, and 6D, respectively.

Figure 7A:
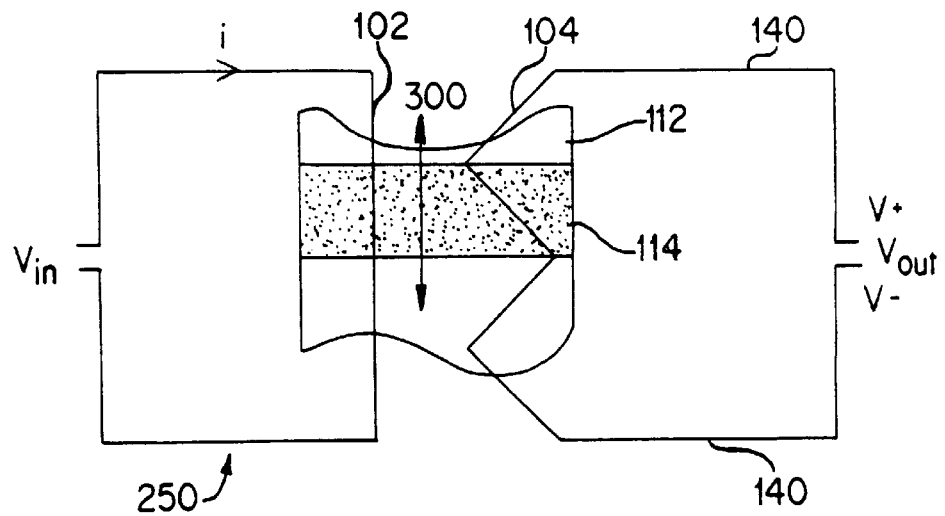
FIG. 7A is a schematic layout of a fifth alternative embodiment of the read head of FIG. 1, which overlays a single disruptive element of the scale of FIG. 2.

The inductive transducer of the present invention can be further simplified from the read head and scales discussed above. As shown in FIG. 7A, an alternative embodiment of the inductive transducer of the present invention is shown as transducer 250. The transducer 250 includes the transmitter winding 102 and receiver winding 104. The receiver winding 104 consists of a single conductive path having spatial variations along its length, such as a zig-zag pattern shown in FIG. 7A. The receiver winding 104 extends approximately parallel with the measuring axis 300, and the spatial variations along its length are with respect to the transmitter winding 102 and the measuring axis. Return paths or measurement leads 140 coupled to the free ends of the receiver winding 104 provide an output path for the receiver output signal (shown as Vout in FIG. 7A). The inductive transducer 250 may be considered as having a "non-loop" receiver where the measurement leads 140 are substantially long and not proximate to the receiver winding 104. The receiver winding 104 must be closed, however, when one measures the induced EMF along the receiver winding, and therefore no actual non-loop receiver patterns are possible.

The transmitter winding 102 includes a single straight conductive path substantially parallel with the measuring axis 300 and proximate to the receiver winding 104. The transmitter winding 102 is coupled to appropriate driving electronics at a terminal Vin shown in FIG. 7A. The transmitter winding 102 produces a magnetic field and flux through the receiver winding 104 with the measurement leads 140. A portion of this magnetic flux is useful for generating a signal, i.e., the portion of the flux affected by the position of the scale 112. Since the receiver winding 104 includes spatial variations along its length, the distance between the transmitter and receiver windings 102 and 104 varies. Consequently, as the scale 112 moves along the measuring axis 300, the plates 114 affect the flux received by the spatially differing portions of the receiver winding 104. For simplicity, a single plate 114 of the scale 112 is shown in FIG. 7A.

Figure 7B:
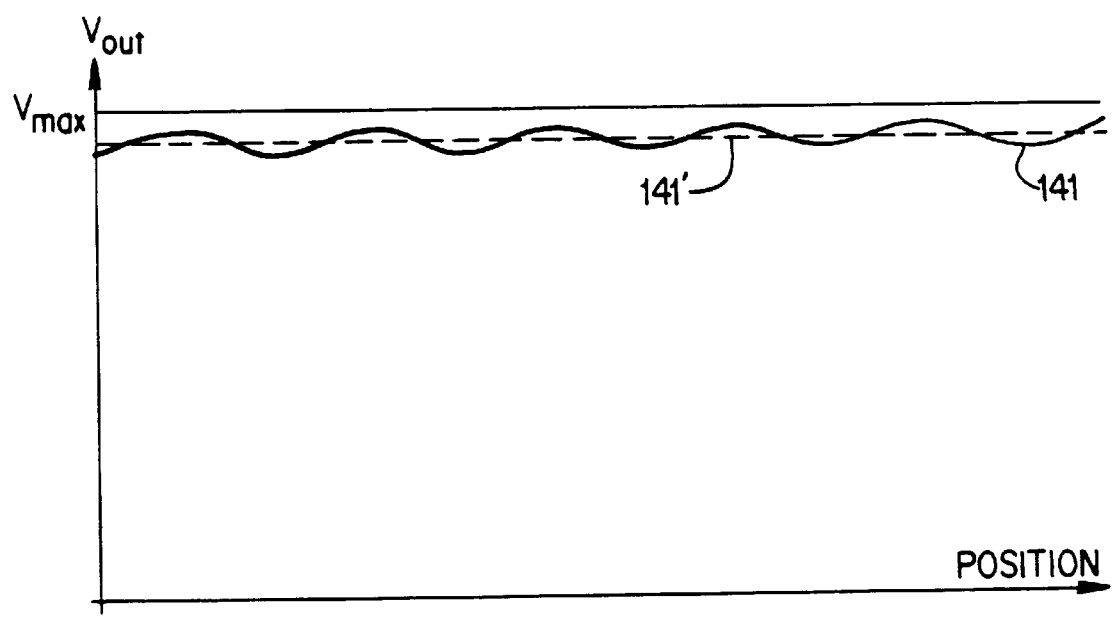
FIG. 7B is a waveform diagram showing a plot of the voltage out of the read head versus the position of the disruptive element for the read head of FIG. 7A.

Because the receiver winding 104 with measurement leads 140 forms an unnecessarily large area through which the transmitter magnetic field extends, direct crosstalk from the magnetic field is unnecessarily large with respect to the useful signal generated thereby. As a result, the large amount of crosstalk diminishes the dynamic range for useful modulation, as shown by a useful output signal 141 in FIG. 7B. A maximum available dynamic range of associated preamplification circuitry (not shown) is represented by $V_{max}$. The direct crosstalk from the transmitter winding 102, shown as the dashed line 141' in FIG. 7B, limits the amplification of the useful signal 141 by a preamplifier. The useful signal 141 shows moderate fluctuations dependent on the position of the plate 141. The direct crosstalk signal 141' adds to the useful signal 141 to thereby reduce the ability of circuitry to amplify the signal 141 (as limited by the dynamic range of preamplification circuits ($V_{max}$)).

Figure 8A:
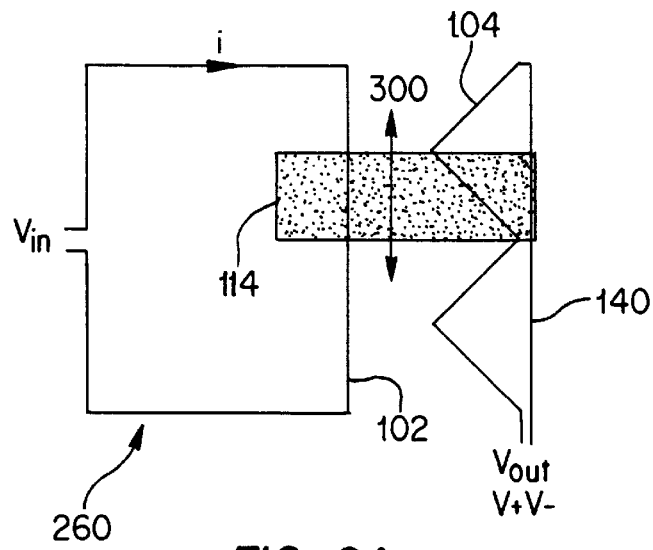
FIG. 8A is a schematic layout of a sixth alternative embodiment of the read head of FIG. 1, which overlays the single disruptive element.
Figure 8B:
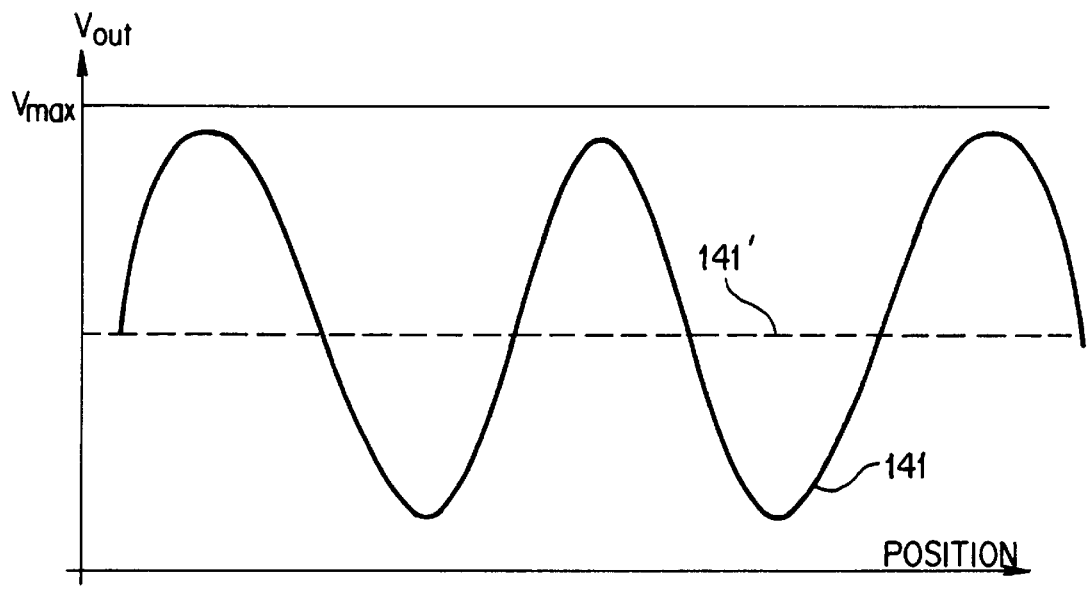
FIG. 8B is a waveform diagram showing a plot of the voltage out of the read head versus the position of the disruptive element for the read head of FIG. 8A.

FIG. 8A shows an alternative inductive transducer 260 that reduces the direct crosstalk from the transmitter winding 102 by placing the measurement lead 140 proximate to the receiver winding 104 and parallel with the measuring axis 300, and thereby reduces the area through which the magnetic field extends. The resulting receiver winding 104 is similar to the read head 138 shown in FIG. 6C. The resulting useful output signal 141 is shown in FIG. 8B as having much greater variation (modulation). The direct crosstalk signal 141' is significantly reduced from that of FIG. 7B.

Figure 9A:
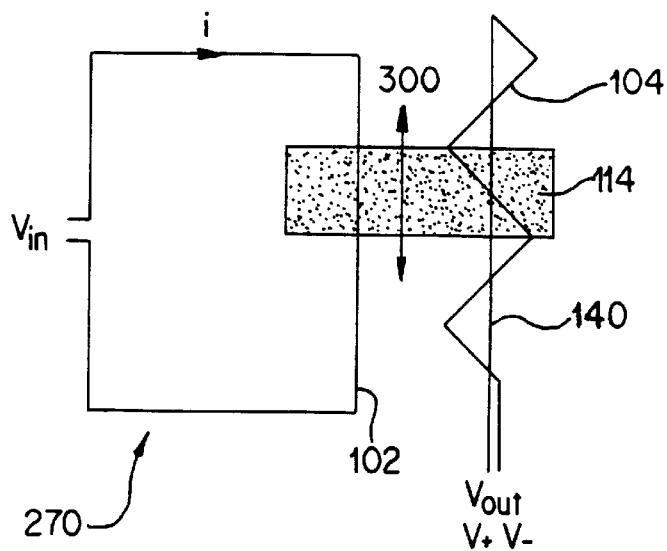
FIG. 9A is a schematic layout of a seventh alternative embodiment of the read head of FIG. 1, which overlays the single disruptive element.
Figure 9B:
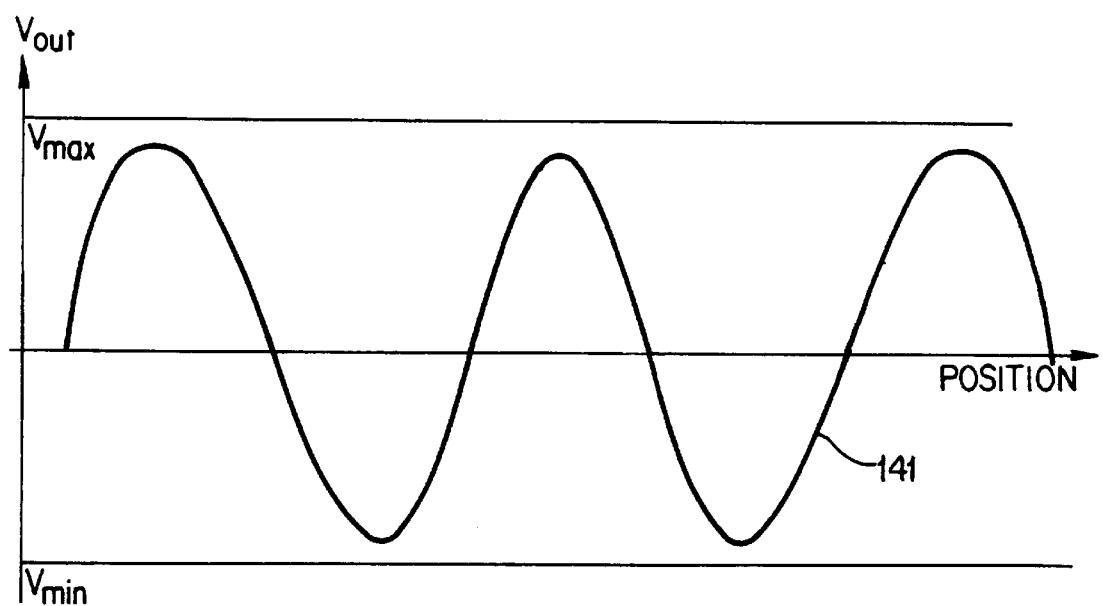
FIG. 9B is a waveform diagram showing a plot of the voltage out of the read head versus the position of the disruptive element for the read head of FIG. 9A.

The receiver winding 104 of the inductive transducer 260 can be modified to eliminate the direct crosstalk signal 141' as shown in FIG. 9A by an alternative inductive transducer 270. The receiver winding 104 in the inductive transducer 270 places the measurement lead 140 through a central axis of the receiver winding 104 and parallel with the measuring axis 300. As a result, the useful signal 141 shown in FIG. 9B lacks any direct crosstalk signal 141' (assuming the receiver winding 104 is at a sufficient distance from the transmitter winding 102 that the magnetic field is uniform through the receiver winding). The useful signal 141 is limited only by the maximum and minimum dynamic range of preamplification circuitry (shown as $V_{max}$ and $V_{min}$ in FIG. 9B).

Figure 10A:
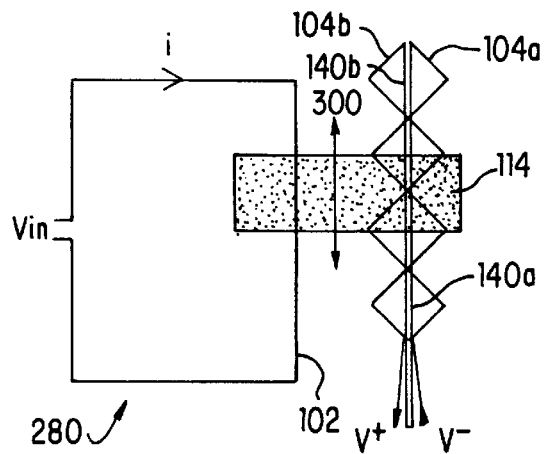
FIG. 10A is a schematic layout of a eighth alternative embodiment of the read head of FIG. 1, which overlays the single disruptive element.

To further improve the inductive transducer 270, an alternative inductive transducer 280 is shown in FIG. 10A. The inductive transducer 280 includes a receiver winding 104a that extends in a zig-zag pattern along a central axis parallel with the measuring axis 300, and then returns along the measurement lead 140a at the central axis. A second receiver winding 104b similarly follows a zig-zag pattern coaxial with the receiver winding 104a, but opposite in spatial phase thereto. The second receiver winding 104b is electrically coupled to the first receiver winding 104a by a second measurement lead 140b also at the central axis.

Figure 10B:
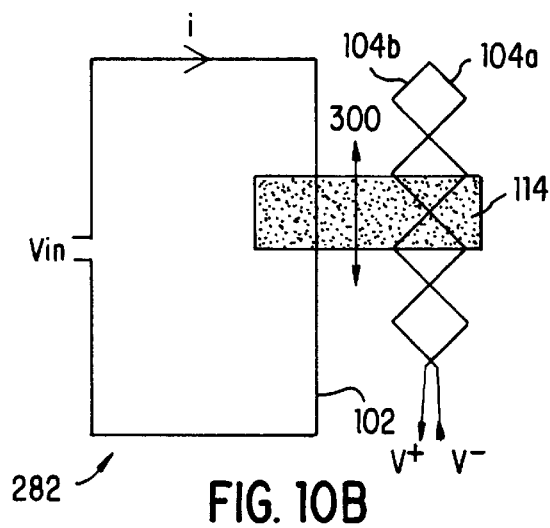
FIG. 10B is a schematic layout of a ninth alternative embodiment of the read head of FIG. 1, which overlays the single disruptive element.

Since the measurement lead 140b extends parallel to, proximate with, and is electrically coupled to the measurement lead 140a, the measurement leads 140a and 140b can be eliminated because they are routed immediately adjacent to each other and therefore do not pick up any magnetic field. As a result, as shown in FIG. 10B, the inductive transducer 280 can be reduced to an alternative inductive transducer 282 that lacks any measurement leads 140a or 140b. The receiver windings 104a and 104b output the useful signal 141, without any effects of direct crosstalk signal 141', even where the transmitter winding 102 does not produce a magnetic field symmetrical around the central axis through the receiver windings. The receiver windings 104a and 104b of the inductive transducer 282 are efficient in that they require no measurement leads since the receiver winding 104b becomes the measurement lead for the receiver winding 104a, and vice versa.

Figure 10C:
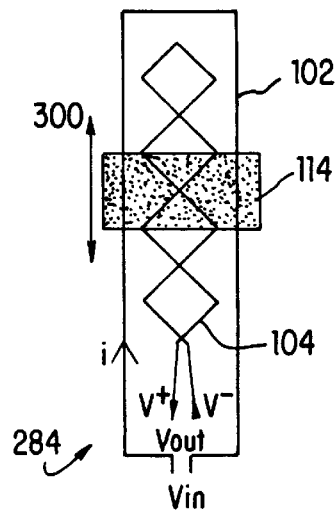
FIG. 10C is a schematic layout of a tenth alternative embodiment of the read head of FIG. 1, which overlays the single disruptive element.

A symmetrical transmitter field is obtained if the receiver loops 104a and 104b are placed within the transmitter loop 102, as shown in an alternative inductive transducer 284 of FIG. 10C. Having eliminated the measurement leads 140a and 140b, the receiver windings 104a and 104b are reduced to a single receiver winding 104. The transmitter winding 102 is more efficient than that in the inductive transducers 250 through 282 because both of the elongated paths of the winding are equally active (i.e., generate usable magnetic field). Additionally, the width of the transmitter winding 102, and thus the read head, is smaller. The resulting inductive transducer 284 is similar to the above-described transducer (shown and described with respect to, e.g., FIGS. 4A and 4B).

The receiver winding 104 of the read head 138 (and the read heads 136, 137, and 139) eliminate the direct crosstalk signal 141' by connecting two receiver loops in series so that they have opposite winding directions (represented by the "−" and "+" loops 106 and 108). The direct crosstalk signals then cancel while the useful modulation signals are doubled. Such an arrangement operates well if the transmitter field generated by the transmitter winding 102 is symmetric around an axis that is coaxial with the center of the receiver windings, and also parallel to the direction of the scale 112 (i.e., the measuring axis 300). Such an arrangement is accomplished by placing the loops 106 and 108 of the receiver winding 104 in the center of the transmitter winding 102 to generate a symmetric field, as shown in the read heads 136 through 139.

Instead of eliminating the direct crosstalk signal 141' as is accomplished by the read heads 136 through 139, a read head arrangement can be constructed that amplifies each receiver loop signal separately, amplitude demodulates them and thereafter subtracts the direct crosstalk signal (a DC signal eliminated after demodulation). An advantage of not eliminating the direct crosstalk signal 141' is that the present invention can employ simple amplitude detection circuitry because the carrier is not removed from the useful signal 141. The read heads 136 through 139, and most of the read heads discussed herein, require more complicated synchronous detection circuitry (as discussed below). A disadvantage of not eliminating the direct crosstalk signal 141' is potential loss of accuracy due to differences between preamplifiers and detection stages.

Figure 11:
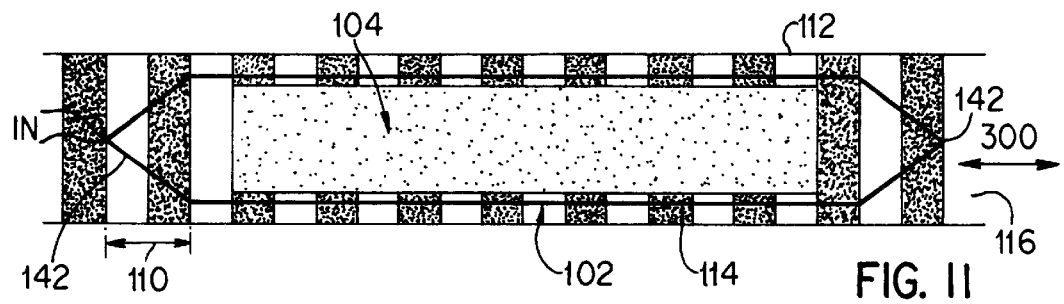
FIG. 11 is a partial schematic, partial block diagram of a eleventh alternative embodiment of the read head of FIG. 1, which overlays the scale of FIG. 2.

The region enclosed by the transmitter winding 102 is preferably as small as possible to enclose the receiver winding 104. The length of the transmitter winding 102 is, however, preferably equal to an integer number of scale wavelengths 110, as shown in FIG. 11, so that the load on the transmitter winding is independent of its scale position. As a result, the transmitter winding 102 always inductively couples to the same number of plates 114.

Figure 12B:
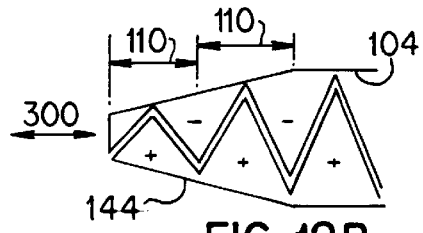
FIG. 12B is a portion of a plan view of a layout of an alternative embodiment of the receiver winding of FIG. 6C.
Figure 12A:
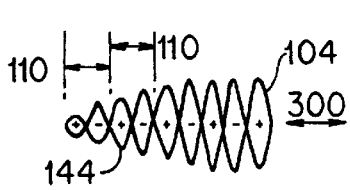
FIG. 12A is a portion of a plan view of a layout of an alternative embodiment of layout of the receiver winding of FIG. 1.

The transmitter magnetic field generated by the transmitter winding 102 can exhibit maximum non-uniformity at its ends. As noted above, the signal output from the receiver winding 104 produced by the disrupting effects of the plates 114 is weak compared to the strong transmitter magnetic field generated by the transmitter winding 102, and it is the balancing of the transmitter magnetic field effects which is important to improved signal-to-noise ratio. Therefore, it is desirable to eliminate any disturbing "unbalanced" cross talk between the transmitter and receiver windings which produces noise in the receiver output signal, which most likely occurs at their end regions. Consequently, the transmitter winding 102 preferably has tapered ends 142 to reduce such asymmetry and edge effects at the ends. Similarly, the receiver winding 104 may have tapered ends 144 as shown in FIGS. 12A and 12B to similarly suppress end and edge effects and reduce sensitivity to tilting misalignments of the read head, about an axis in the plane of the read head and perpendicular to the measuring axis 300. Additionally, the end portions 142 of the transmitter winding 102 preferably begin at least one-half of a wavelength 110 beyond the receiver winding 104 and extend at least one wavelength 110 (shown as a shaded block 104 in FIG. 10).

Figure 13:
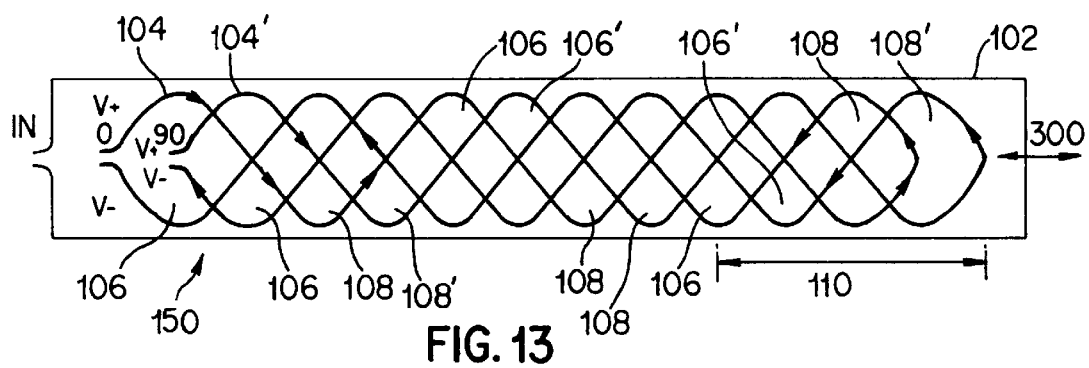
FIG. 13 is a plan view showing a layout of a twelfth alternative embodiment of the read head of FIG. 1.

An improved read head 150, shown in FIG. 13, has two receiver windings 104 and 104' placed one-quarter of the scale wavelength 110 from each other. The second receiver winding 104' overlays the first receiver winding 104 and is offset by one-quarter of the scale wavelength 110 so that each "+" loop 106' of the receiving winding 104' overlays a portion of a "+" loop 106 and a portion of a "−" loop 108 of the receiver winding 104. Similarly, each "−" loop 108' of the receiver winding 104' overlaps a portion of a "+" loop 106 and a portion of a "−" loop 108 of the receiver winding 104. Insulation or crossover vias are suitably placed to electrically isolate the winding 104 from the winding 104'. By being one-quarter of a scale wavelength apart, the receiver windings 104 and 104' are in quadrature, thereby causing the signals output from the receiver windings to be 90° (¼ of the wavelength 110) out of phase with respect to the signal cycle resulting from displacement along the measuring axis 300. As a result, the below described circuitry can detect the transitions between the signals from each of the receiver windings 104 and 104', and by comparing these transitions, can determine the direction in which the scale 112 moves relative to the read head 150. For the read head of FIG. 13, the amplitudes of the output signals S1 and S2 from the read head vary sinusoidally with the position of the scale 112 relative to the read head 150. Thus, the below described circuitry can also determine the position of the read head 150 with respect to the scale 112 by the following equation:

$$p = \left[ \frac{\operatorname{atan}\left(\frac{S1}{S2}\right)}{2\pi} \right] (\lambda) + (n)(\lambda) \quad (1)$$

where S1 and S2 are the amplitudes of the two signals received from the receiver windings 104 and 104', the atan function provides an angle between zero and $2\pi$ corresponding to the ratio between S1 and S2, $\lambda$ is the scale wavelength 110, and n is an integer indicating the number of full scale wavelengths 10 traveled.

Figure 14:
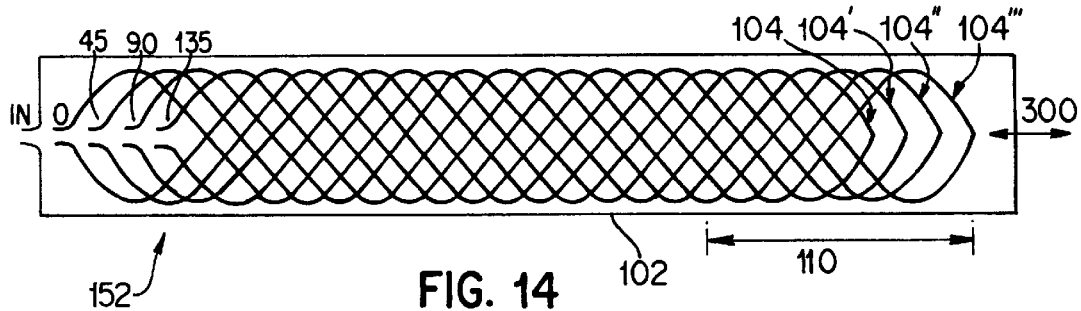
FIG. 14 is a plan view showing a layout of a thirteenth alternative embodiment of the read head of FIG. 1.

To improve accuracy, or reduce demands in analog signal processing circuitry for the receiver output signal, more than two overlapping receiver windings may be used in the read head. As shown in FIG. 14, four overlapping receiver windings 104, 104', 104" and 104'" of a read head 152 are each ⅛ of a scale wavelength 110 apart (i.e., 45° apart from each other). Therefore, if the receiver winding 104 has a phase of zero, the receiver windings 104', 104", and 104'" are respectively out-of-phase by 45°, 90° and 135°. While being more difficult to manufacture, the read head 152 can provide certain advantages, in combination with certain signal processing techniques, to provide more accurate position readings than the read head 150.

Figure 15:
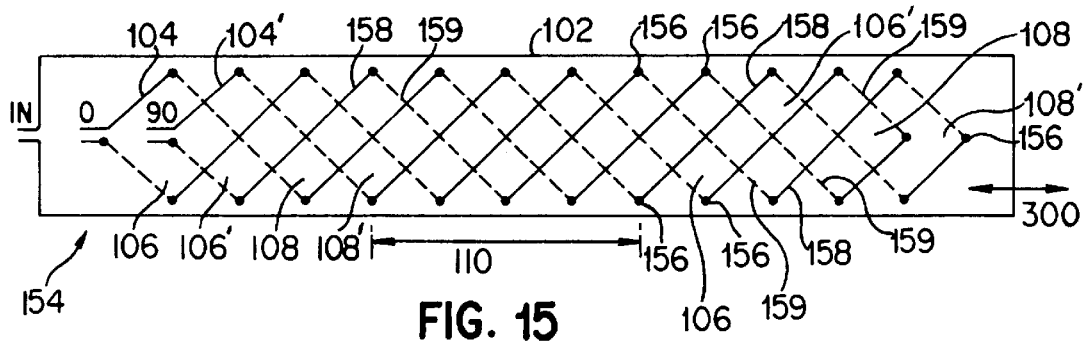
FIG. 15 is a plan view showing a layout of an fourteenth alternative embodiment of the read head of FIG. 1.

The read heads 150 and 152 of FIGS. 13 and 14 are difficult to manufacture in a highly planar construction because they require layers of insulation to be placed between the various receiver windings, and require that each receiver winding be insulated from itself at points where the winding crosses over itself. FIG. 15 shows a read head 154 that can be manufactured on two sides of a single printed circuit board, or on a single printed circuit board with a single layer of insulation between the windings. As shown in FIG. 15, a series of diagonal wires or conductive paths are deposited on one layer (shown as solid lines 158), while a series of diagonal conductive paths, angled in an opposite direction, are deposited on the second layer (shown as dashed lines 159). The ends of each conductive path 158 and 159 are electrically intercoupled through the separating insulative layer by means of vias 156, using known printed circuit board technology. As a result, the receiver windings 104 and 104' produce substantially square or diamond-shaped loops 106, 106', 108 and 108'. Those skilled in the art will recognize that, based on the detailed description herein, sinusoidally shaped loops and other configurations can also be achieved. Also, more receiver windings, separated by the same insulative layer, can be employed, limited only by the space available for such windings.

The receiver windings 104 and 104' of the read head 154 are accurately balanced relative to each other because each winding has an equal number of conductive paths 158 and 159 formed on the two layers. As shown in FIG. 15, each "+" loop 106 and 106' in the read head 154 has two sides of the loop formed by conductive paths 158 in the upper layer, and two sides of the loop formed by conductive paths 159 in the lower layer. The same is true for the "−" loops 108 and 108'. As a result, the signal output from each receiver winding 104 and 104' is equal, because each loop has the same total proximity to the disrupters 114.

A linear encoder with the read head 150 having a scale wavelength of 5.08 mm was tested for accuracy. A driving signal of 5 MHz frequency was fed to the transmitter winding 102. The amplitudes of the two output voltages from the receiver windings 104 and 104' varied sinusoidally with the position between the read head 150 and the scale 112 as the scale was moved. The gap 127 between the scale 112 and the read head 150 was approximately 0.6 mm. Using equation (1) above, a position accuracy of plus or minus 10 $\mu$m was achieved. Experimentation with the receiver winding 154 under similar conditions produced a position accuracy of approximately plus or minus 20 $\mu$m.

As noted above, the present invention may be used in encoder applications other than linear encoder applications. FIGS. 16A and 16B show an alternative embodiment of the inductive transducer of the present invention adapted for use in a rotary encoder 160.

The rotary encoder 160 includes a stationary portion or stator 161 having the transmitter winding 102 and the receiver winding 104, and a rotating portion or rotor 163 having the conductive plates 114 secured thereto (shown in dashed lines in FIG. 16A). The transmitter winding 102 and the receiver winding 104 of the stator 161 are formed into a planar ring as if the ends of the read head 100 of FIG. 1 were curved and bent so as to meet in the same plane. As shown in FIG. 16A, the ends of the transmitter winding 102 meet at location M on the stator 161, while the ends of the receiver winding 104 meet at location N. Similarly, the rotor 163 includes the conductive plates 114 deposited on the rotor, as if the ends of the scale 112 were similarly curved and bent to meet in the same plane.

The rotor 163 rotates about a central point 164. When the rotor 163 rotates, the conductive plates 114 are alternatively positioned proximate to the "+" loops 106 and the "−" loops 108 in the receiver winding 104. As with the linear encoder described above, the receiver winding 104 outputs a changing signal representing the rotation of the rotor 163 with respect to the stator 161.

The receiver and transmitter windings 104 and 102 are fixed to a suitable disk or ring-shaped substrate 126, such as a printed circuit board, and are electrically separated by insulative layers 162 (shown in FIG. 16B). The two ends of the transmitter winding 102 extend parallel to each other (shown as end lines I–J and K–L in FIG. 16A). As a result, edge effects and other magnetic field distortions can occur at location M. Similar edge effects can be created at location N in the receiver windings 104. Such edge effects can cause distortion in the signal output from the receiver winding 104.

Consequently, as shown in FIGS. 17A and 17B, an alternative rotary encoder 170 eliminates the end point locations M and N by providing "seamless" transmitter and receiver windings 102 and 104. In the rotary encoder 170, the end lines of the transmitter winding 102 I–J and K–L are positioned on separate planes, directly above each other, and are separated by a thin insulative layer 162 (see FIG. 17B). As a result, the edge magnetic fields created by the end lines I–J and K–L cancel (due to current flowing in opposite directions) and thereby have no disturbing effect on the output signal from the receiver winding 104. Additionally, the end lines I–J and K–L are preferably secured on the side of the supporting substrate 126 opposite to the side on which the remainder of the transmitter winding 102 and the receiver windings 104 are secured, thereby distancing the end lines I–J and K–L from the receiver winding to further reduce crosstalk noise.

The receiver winding 104 of the rotary encoder 170 can be manufactured by depositing a first sinusoidal winding 165 on the substrate 126, and then depositing a second sinusoidal winding 166, 180 degrees out of phase with the first winding. (Of course, the first and second sinusoidal windings 165 and 166 must be insulated from each other as they cross over one another to prevent short circuiting between the two windings.) The windings 165 and 166 are then serially connected at the point O–P and G–H in FIG. 17A.

The line O–P is preferably routed from the stator 163 in parallel with and on top of an output line Q–R of the receiver winding 104, and separated by a thin insulation layer therebetween. In this way these connecting leads do not create any loop that could pick up unwanted crosstalk from the transmitter winding 102. The lines G–H and E–F for the other lines of the receiver winding 104, and the lines A B and C–D for the transmitter winding 102, are preferably routed in parallel, with thin insulation therebetween, to similarly cancel magnetic fields and reduce noise. While the rotors 160 and 170 show only one receiver winding 104, additional receiver windings, separated by appropriate insulative layers 162, can be located on the stator 161 so as to produce quadrature output signals, as described above.

FIG. 18A shows a cylindrical, rotary encoder 180 having an inner cylindrical rotor 163 with conductive plates 114 retained at its exterior (see FIG. 18B). Alternatively, as shown in FIG. 18C, an alternative cylindrical, rotary encoder 182 employs an inner cylindrical rotor 183 that has conductive portions 114 extending radially, and at regular intervals, from a central axis or point 164, e.g., teeth extending radially from a wheel-like member. The inner cylindrical rotor 183 can be a gear, cog or similar cylindrically-shaped member having regularly and radially raised or extending portions. Each extending portion operates as one of the conductive plates 114.

Both cylindrical, rotary encoders 180 and 182 employ an outer cylindrical stator 161 that includes the transmitter winding 102 and the receiver winding 104 retained at its interior. Similarly, FIG. 19A shows another alternative cylindrical, rotary encoder 190 having an inner cylindrical stator 161 having the transmitter winding 102 and the receiver winding 104 affixed at its exterior (see FIG. 19B) and an outer, cylindrical rotor 163 having the conductive plates 114 secured at its interior. The stator 161 of the cylindrical, rotary encoders 180 and 190 are formed as if the ends of the read head 100 are bent and curved in a plane perpendicular to the plane of FIG. 1 until they meet. Similarly, the rotor 163 of the rotary, cylindrical encoders 180 and 190 are formed as if the ends of the scale 112 of FIG. 2 are bent in a plane perpendicular to the plane of FIG. 2 until they meet.

As described above with respect to the rotary encoders 160 and 170, the cylindrical, rotary encoders 180 and 190 function by generating a magnetic field from the transmitter winding 102 while rotating the rotor 163 about the point 164. The conductive plates 114 are alternatively located proximate to the "+" loops 106 and the "−" loops 108 of the receiver winding 104 so as to produce a varying output signal from the receiver winding.

In addition, those skilled in the art will recognize, based on the detailed description herein, that by forming the read head 100 and scale 112 on flexible circuit materials, such flexible materials could be affixed to cylinders or portions of cylinders which are rotatable concentric with the measuring axis 300. Therefore, linear encoders could be constructed into relatively cylindrical configurations, as opposed to the relatively planar configuration such as that shown in FIGS. 3A and 3B.

FIG. 20 shows a circuit 200 for implementing the above-described linear, rotary, and cylindrical-rotary and cylindrical-linear encoders, or generally, for implementing the inductive transducer of the present invention. The circuit 200 includes a signal generator 202 that provides a high-frequency current (approximately several MHz) to the transmitter winding 102. An equivalent circuit for the transducer of the present invention is shown in dashed block 204. The conductive plates 114 of the scale 112 are represented by a serially connected inductor L and resistor R As the scale 112 moves, its conductive plates 114 alternatively inductively couple to the receiver windings 104 and 104' of a read head having two receiver windings, such as the read head 150 shown in FIG. 13.

In the equivalent circuit 204 of FIG. 20, the receiver windings 104 and 104' are represented by two sections 229 and 231, and 229' and 231', respectively, such that the magnetic field generated by the transmitter winding 102 is balanced out in the receiver windings 104 and 104', as in a differential transformer. Thus, similar to the receiver winding 104 of FIG. 4, the receiver windings 104 and 104' of FIG. 20 only sense the influence of the magnetic field caused by the disrupting flux generated by the conductive plates of the scale 112.

The output signals of the receiver windings 104 and 104' are amplified by amplifiers 206. The amplitudes of the output signals are obtained by synchronous demodulation detection. Under synchronous demodulation detection, the amplified receiver signals are mixed with the transmitter signal from the signal generator 202 by mixers 208. Low pass filters 210 pass only the low frequency part of the mixed signal, which are input to a sample and hold circuit 212 as signals S1 and S2 (corresponding to receiver windings 104 and 104' respectively).

The sample and hold circuit 212 includes switches with their associated capacitors. The sample and hold circuit 212 samples the signals SI and S2 simultaneously on command from a microprocessor 216 at the beginning of a measurement cycle. The outputs of the sample and hold circuit 212 are switched by the microprocessor 216 to be alternatively input to an analog-to-digital converter 214. The microprocessor 216 receives the digitized signals from the A/D converter 214, processes the digitized signals, and outputs an appropriate signal to a display 218. Alternatively, the computed position can be output to other systems, for example, to statistical process control or as position feedback in a servo positioning system. The circuitry of FIG. 20, and all of the circuitry described herein, can be readily incorporated into the hand-held encoder 118, as being mounted on the printed circuit board substrate 126 within the hand-held encoder housing 122 (FIG. 3B).

The microprocessor 216 can evaluate the position of the scale 112 using several methods. For the example of two receiver windings 104 and 104', the microprocessor 216 calculates the position between the scale 112 and the windings from Equation (1) above. In a more general case employing two or more receiver windings, the microprocessor 216 uses the following equation:

$$p = \operatorname{atan}\left[\frac{\sum_{v=1}^{m} S_v \cdot \sin((v-1)\pi/m)}{\sum_{v=1}^{m} S_v \cdot \cos((v-1)\pi/m)}\right] \cdot \frac{\lambda}{2\pi} + n \cdot \lambda \tag{2}$$

where $S_v$ is the amplitude of the output from a given receiver winding at a certain position, where v=1 . . . m, m is the number of receiver windings, $\lambda$ is the encoder wavelength 110, n is the number of full wavelengths traveled, and the function atan provides an angle between 0 and $2\pi$. For the preferred two receiver windings embodiment, the microprocessor 216 accumulates the number n of full wavelengths 110 as the scale 112 travels with respect to the receiver windings 104 and 104' by using well-known methods and combines the accumulated number of wavelengths, or "coarse" position information, with the position within a wavelength 110, according to Equation 2, so as to avoid ambiguity or error in position measurements as the scale and receiver windings are moved over a distance greater than one wavelength.

A capacitor 217 is coupled in parallel with the transmitter winding 102. The capacitance of the capacitor 217 is chosen so that it resonates with the inductance of the transmitter winding 102, thereby reducing the load on the transmitter signal generator 202. Capacitors 219 and 219' are similarly electrically coupled in parallel with the receiver windings 104 and 104', respectively. The capacitances of the capacitors 219 and 219' are also chosen so that they resonate with the inductances of the receiver windings 104 and 104', thereby increasing the strength of the signal output from the receiver windings. The capacitors 219 and 219' additionally allow the receiver windings 104 and 104' to be more selective by filtering unwanted noise.

A transducer 224 in an alternative circuit 220 shown in FIG. 21 is similar to the transducer 204 of circuit 200, except that the operating role of the winding 102 and windings 104 and 104' of circuit 200 are reversed so that the circuit 220 includes two transmitter windings 104 and 104', and one receiver winding 102. A phase delay circuit 226 delays the signal from a signal generator 402 to the second transmitter winding 104'. As the scale 112 moves with respect to the two transmitter windings 104 and 104', the receiver winding 102 outputs a signal S that is amplified by the amplifier 206. The value of the signal S can be represented by Equation (3):

$$S = A(\cos(kp) \cdot \cos(\omega t) + \sin(kp) \cdot \sin(\omega t)) = A\cos(\omega t - kp) \quad (3)$$

where A is a constant, k is $2\pi/\lambda$ and $\omega$ is $2\pi f$. The phase of the signal S relative to a high frequency signal generated by signal generator 402 provides the position p. The phase is measured by a phase meter 228, which compares signal S to the signal from the signal generator 402. The signal kp is then input to additional processing circuitry similar to the sample and hold circuit 212, the A/D converter 214, the microprocessor 216, and the display 218 of the circuit 200.

To improve accuracy, the transducer 224 of the circuit 220 can include any number of transmitter windings (such as four for the read head 152 of FIG. 14). For an arbitrary number m of transmitter windings, Equation (3) can be expanded to Equation (4) shown below.

$$S = A \sum_{v=1}^{m} \cos(\omega t - (v-1)\pi/m) \cdot \cos(kp - (v-1)\pi/m)$$

$$= \frac{1}{2} A \sum_{v=1}^{m} [\cos(\omega t + kp - (v-1)2\pi/m) + \cos(\omega t - kp)]$$

$$= 0 + \frac{m}{2} A \cos(\omega t - kp)$$

(4)

As above, the phase between the received and transmitted signals provides the position p of the scale 112.

FIG. 22A shows an example of the signal generator 202 that is particularly suitable for low-power use, such as for use in hand-held battery-powered measurement tools (e.g., hand-held encoders, micrometers, tape measures, etc.). The circuit 202 includes the transmitter winding 102, a capacitor 232, a resistor 234, and a transistor 236, connected as shown in FIG. 22A. FIG. 22B shows an alternative topology for the signal generator 202. At rest, all charge on the capacitor 232 has been discharged through the resistor 234. A pulse-generating circuit 238 supplies a short pulse to the control terminal of the transistor 236, which in turn shorts the capacitor 232 to ground. As a result, the capacitor 232 becomes charged to the supply voltage +V (generated from an appropriate power source such as a battery).

Since the transmitter winding 102 (an inductor) and the capacitor 232 form a resonant circuit, a voltage transient measured at node A will have a resonant behavior as shown in FIG. 23. This transient voltage signal is inductively transmitted by the transmitter winding 102 to the receiver winding 104, as shown in FIGS. 24A through 24C. The amplitude of the received signal depends on the relative position between the scale 112 and the receiver winding 104. For example, if the receiver signal of FIG. 24A is sampled at time point B, the sample indicates that the relative position between the scale 112 and the receiver winding 104 is such that a positive polarity signal of maximum amplitude results. Experimentation with a transducer according to FIG. 13 showed that with an inductance of the receiver winding 104 of 0.5 $\mu$H, a capacitor 232 of 1 nF, a gap 127 of approximately 0.5 mm, and a power supply voltage +V of 3 volts, the maximum receiver output signal at time point B was approximately 60 mV at a resonant frequency of the circuit 202 of about 7 MHZ. FIG. 24B shows a receiver signal with the scale 112 moved ¼ $\lambda$ from the position of FIG. 24A, so as to produce a output signal of zero amplitude when sampled at time point B. In FIG. 24C, the scale 112 has been moved ½ $\lambda$ from the position of FIG. 24A to produce a negative polarity signal of maximum amplitude, as sampled at time point B.

During each sampling of the receiver output signal, the capacitor 232 charges and discharges. To provide sufficient accuracy and motion-tracking capability for the inductive transducer of the present invention, a sampling frequency of about 1 kHz is preferred. If the capacitor 232 has a value of 1 nF, the charge provided by the power supply is equal to (capacitance)×(voltage change)=$3 \times 10^{-9}$ or 3 nC. With a measurement frequency of 1 kHz, the average current draw from the power supply is $3 \times 10^{-6}$ amps which equals 3 $\mu$A. Three microamperes is a very small current, even for a battery-powered transducer. Therefore, the driving circuit 202 is able to provide a low duty cycle, and provide a strong output signal (about 60 m Vmax) from the receiver winding 104, while still using a very small average current and a rapid sampling rate.

To further reduce power consumption, the input pulse generated by the pulse generator 238 to the transistor 236 should be as short as possible, so that the charge lost through the resistor 234 is minimized. In the above example, if the pulse length is one microsecond and resistor 234 has a value of 10 k$\Omega$, the average current through the resistor is only 0.3 $\mu$A.

The previously described electronics are preferably employed with two receiver windings, as described. However, as shown in FIG. 20, receiver winding 104, and receiving winding 104' are connected to identical signal processing channels, each enabled by microprocessor 216. Therefore, it will be obvious to one skilled in the art that the circuitry of FIG. 20 could be employed with only a single receiver winding 104, but subject to certain limitations noted herein.

Figure 24D:
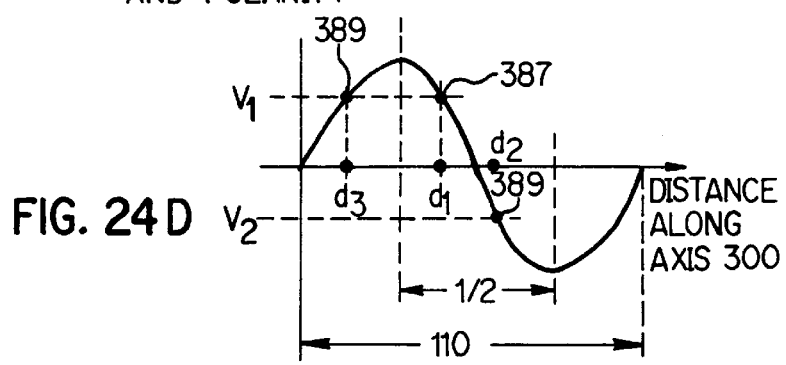
FIG. 24D is a waveform diagram showing a plot of the output amplitude and polarity of the read head of FIG. 1 versus position of the scale of FIG. 2.

Using known interpolation routines, the microprocessor 216 can provide a position measurement that is well below the length of the wavelength 110. The microprocessor 216 can determine an absolute position measurement within one-half of the wavelength 110. For example, as shown in FIG. 24D, within one-half of the wavelength 110, the microprocessor 216 can distinguish between positions $d_1$ and $d_2$ by comparing the amplitude and polarity of the receiver output signal at points 387 and 388, respectively. The point 387 has a voltage value of $V_1$, while point 388 has a voltage value of $V_2$. However, the microprocessor 216 cannot determine the absolute position between the positions $d_1$ and $d_3$. The position $d_3$ corresponds to the point 389 in the receiver output signal of FIG. 24D. The point 389 has the same voltage value $V_1$ as the point 387.

However, for certain applications, position output signals that are ambiguous beyond a range of one-half of wavelength 110 may not be a problem. For example, it may be desirable to preset the transducer to a specific known position along a long measuring range coinciding with the length of scale 112, and then monitor deviations in position at a high resolution and accuracy only over a small range less than one-half of wavelength 110. Such a system would be useful for providing a high resolution "limit signal," for example, where it is desirable that a trigger point for the limit signal be readily adjustable to conform to the physical dimensions of different workpiece set-up configurations. In such a system, Equations (1) through (4) are not employed by the microprocessor 216. Rather, the periodic output versus position function from the transducer is simply characterized and stored by the microprocessor 216 and the output signal is unambiguously converted into a position reading within the known one-half wavelength measuring interval, under well-known methods.

For some such applications, the utility of the device may be increased by employing a relatively long wavelength 110. In such cases, the increased accuracy of the present invention is particularly useful for providing higher resolution and accuracy despite the relatively long wavelength. In such applications, in addition to the benefits provided by a readily adjustable measuring position, the present invention enjoys other advantages over prior art "analog" transducers of similar measuring range, in that repeated wavelengths of the receiver winding and scale reinforce each other to provide a relatively stronger signal (better signal-to-noise ratio) than a sensor spanning only the desired measuring range.

Furthermore, the errors associated with any feature placements which deviate from the ideal (due to manufacturing tolerances, for example) will tend to average out over the span of repeated wavelengths, thus providing improved accuracy relative to a similarly fabricated sensor spanning only the desired measuring range. Moreover, certain applications may be subject to physical constraints upon the direction or speed of motion, such that a suitably fast microprocessor, aided by customized processing algorithms which take into account the physical constraints of the motion system, could overcome any position ambiguities associated with a single receiver winding transducer by continually updating and recording the motion history of the transducer elements. In all cases, the advantages of the low-power inductive transducing system are retained. Thus, a transducer system employing a single receiver winding 104 (such as that shown in FIG. 4A), using only one channel of the signal processing circuitry shown in FIG. 20, can be seen to retain several of the inventive advantages and utility provided by the preferred embodiment.

Achieving high accuracy and resolution under the present invention could lead to difficulties in manufacturing the read head to accommodate all phases of the receiver winding within one scale wavelength. Therefore, in an alternative embodiment of the read head shown in FIG. 25, two phases of receiver windings 104 and 104' are spread out over three scale wavelengths 110, with gaps or spaces between adjacent loops 106, 108, 106', and 108'. Alternatively, the transducer of FIG. 25 can be readily modified to provide only one receiver winding 104 by eliminating the winding 104', or modified to add greater than two windings. As shown in FIG. 25, a full wavelength 110' of the receiver (including receiver winding 104 and 104') is greater than the wavelength 110 of the scale 112, and is preferably an integer multiple of the scale wavelength.

The two-phase transducer of FIG. 25 has a layout similar to that shown in FIG. 15 whereby one-half of each loop in the receiver windings 104 and 104' is formed on a first layer by conductive paths 158 (solid lines), and one-half on a second layer formed by conductive paths 159 (dashed lines). The two layers are separated from each other by a thin insulative layer (not shown) and are electrically intercoupled by vias 156. Unlike the diamond or square-shaped loops of FIG. 15, the loops 106, 106', 108 and 108' of FIG. 25 are laid out in rectangularly-shaped loops. Loops having shapes other than rectangular can be employed, as discussed herein. The width of each rectangle is approximately equal to the width of each conductive bar 114.

The loops 106, 106', 108 and 108', however, do not overlap, but are instead laid out consecutively, as shown in FIG. 25 (the loops for the receiver winding 104 being indicated with a "1" while the loops for the receiver winding 104' being indicated with a "2"). The "+" loops 106 and "−" loops 108 in the receiver winding 104 are not immediately adjacent to each other, but instead are spaced apart and electrically interconnected by interconnecting conductors 158' and 159' on the first and second layers, respectively. Nevertheless, due to the cooperative spacing of the disrupter elements 114, the receiver windings 104 and 104' will display a continuously changing output signal in response to continuous motion of the disrupters. The interconnecting conductors 158' and 159' are preferably positioned over each other along the measuring axis 300, are routed in alignment with each other, so that they do not create any magnetic flux receiving area that can create erroneous receiver output signals, as explained above. The loops 106' and 108' in the receiver winding 104' are similarly spaced apart and electrically interconnected by interconnecting conductors 158' and 159'.

The length of each loop, and the space between the loops, are arranged such that when the scale 112 is positioned as shown in FIG. 25, the conductive plates 114 disrupt the flux through the "+" loops 106 while not disrupting the flux through the "−" loops 108 of the receiver winding 104. As a result, the receiver winding 104 produces an output signal having a maximum negative amplitude. The receiver winding 104' produces a zero output signal since one-half of each loop 106' and 108' is disrupted, thus producing a net zero amplitude output signal from the receiver winding 104'.

Such a construction is of particular use when the size wavelength 110 of the plates 114 in FIG. 25 are dictated by the transducer's application to be narrow compared to the practical manufacturing limitations required to produce the loops 106 and 108, 106' and 108'. An anticipated application of such a construction is the case where the scale 112 is provided by existing linear motor laminations (providing a scale construction similar to the scale 134 of FIG. 5C). In this case, the read head could be adapted to an existing linear motor part, and a separate transducer scale would not be required.

In an alternative embodiment of the scale 112, a scale 316 is formed as a sheet of electrically-conductive material that has regularly-spaced holes 318 formed therethrough, as shown in FIGS. 26A and 26B. The scale 316 may be readily manufactured from sheet metal with the holes 318 stamped or punched therethrough. As a result, the scale 316 can be more readily and inexpensively manufactured than other scales described herein, and may be particularly suited for certain applications.

Figure 27A:
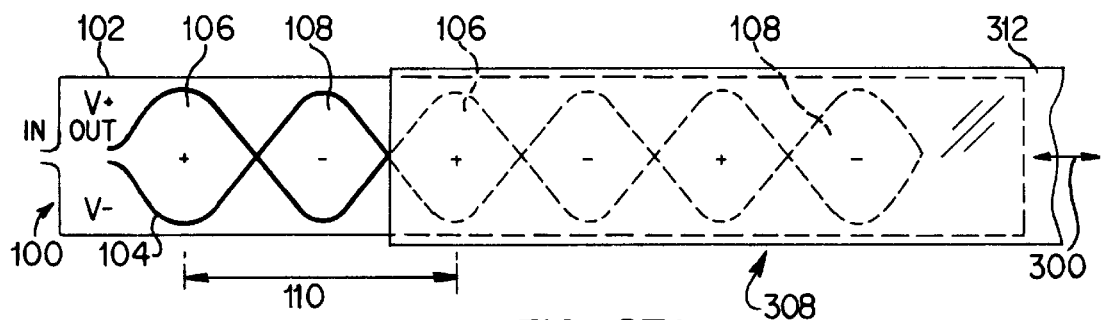
FIG. 27A is a plan view showing a fifth alternative embodiment of the scale of FIG. 2 overlaying the read head of FIG. 1 so as to intercouple the scale with a portion of the read head.

In some applications, the scale 112 having a plurality of plates 114 may be impractical or unnecessary, such as in applications that require the monitoring of the position of a single workpiece composed of a conductive material. Therefore, in an alternative embodiment of the scale 112, an unbroken or continuous conductive surface or member 312 is shown in FIG. 27A as partially overlaying the transmitter and receiver windings 102 and 104, to form an alternative transducer 308. The conductive member 312 can be longer than the receiver winding 104 along the measuring axis 300. The conductive member 312 can be an elongated rectangular deposition of copper or other conductive material on the substrate 116, or be any workpiece composed of a conductive material, which partially overlays several of the "+" and "−" loops 106 and 108 of the receiver winding 104.

Figure 27B:
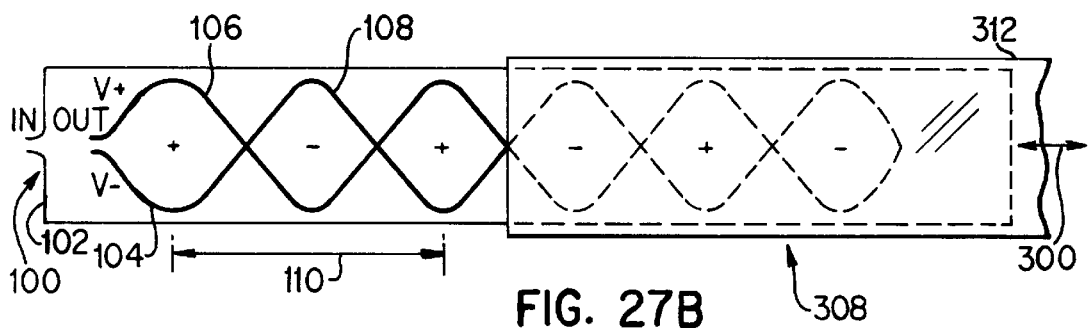
FIG. 27B is a plan view of the alternative embodiment of FIG. 27A showing the scale intercoupling with another portion of the read head.

The conductive member 312 absorbs and disrupts the magnetic field produced by the transmitter winding 102 as described above with respect to the scale 112. As shown in FIG. 27A, the conductive member 312 overlays all but a single "+" loop 106 and a single "−" loop 108 of the receiver winding 104. As a result, the receiver output signal has a net zero value. As the conductive member 312 is moved rightward along the measuring axis 300 to expose two "+" loops 106, but only one "−" loop 108, as shown in FIG. 27B, the receiver output signal has a maximum positive voltage value. Consequently, as the conductive member 312 moves along the measuring axis 300, the receiver winding 104 produces an output signal as shown in FIG. 27C.

Figure 27C:
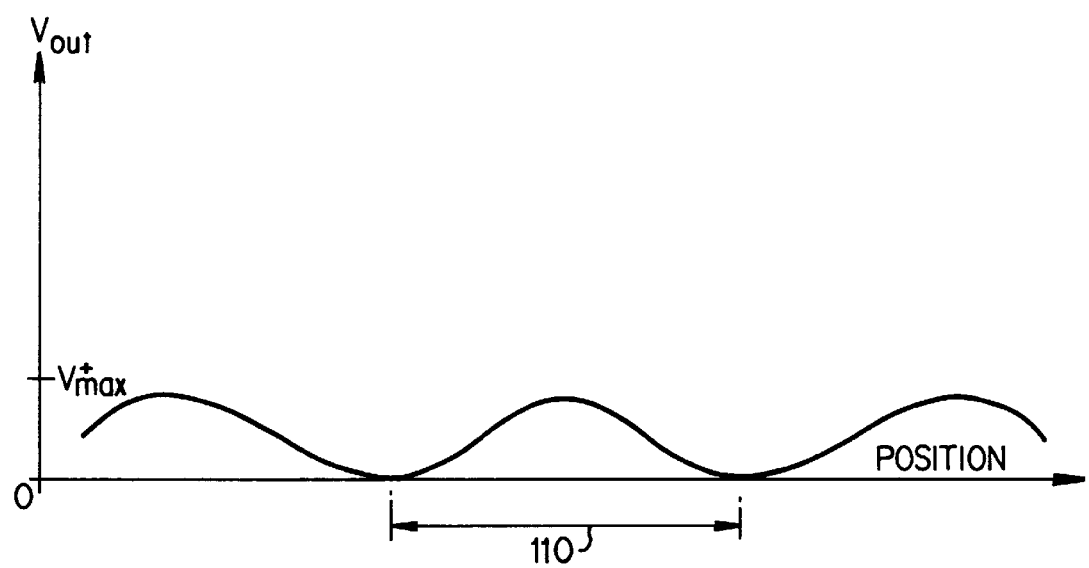
FIG. 27C is a waveform diagram showing a plot of the voltage out of the read head versus the position of the scale for the transducer of FIG. 27A.

As shown in FIG. 27C, the receiver output signal varies from a minimum of zero volts where an even number of "+" and "−" loops 106 and 108 are undisrupted by the conductive member 312 (FIG. 27A) to a maximum voltage output signal of $V_{max}$ when one additional "+" loop is fully undisrupted (FIG. 27B). If the "+" and "−" loops 106 and 108 in the receiver winding 104 were arranged such that the alternating pattern of loops began with a "−" loop in FIGS. 27A and 27B, then the receiver output signal would vary between a maximum negative voltage and zero.

An advantage of the transducer 308 is that the scale is simple to manufacture since its manufacture does not require the spaced-apart rectangular plates 114 discussed above. Additionally, the conductive member 312 can be any conductive member such as a machined part, the position of which one desires to monitor or control. A disadvantage of the transducer 308 is that the signal strength shown in FIG. 27C is lower than that in other embodiments because only one receiver winding loop (a "+" or "−" loop 106 or 108) contributes to the output signal, rather than multiple loops. Another disadvantage is that the measurement range is limited to the length of the read head. This disadvantage can be overcome by manufacturing a much longer read head. A longer read head, however, will be more expensive to manufacture than a shorter-length read head. The shorter-length read head could still be used in applications requiring only a limited range at which to measure or monitor motion.

Furthermore, the transducer 308 may also suffer from less accuracy than previously described embodiments, because, in part, the transducer may be more sensitive to variations in the gap 127. The transducer 308 can be employed in other arrangement besides the planar arrangement shown in FIGS. 27A and 27B. For example, the transmitter and receiver windings 102 and 104 can be arranged in a cylindrical fashion where the measuring axis is directed with respect to the cylinder and the conductive plate 312 can be a conductive rod that moves coaxially along the measuring axis 300.

Figure 28:
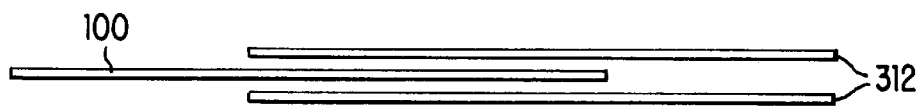
FIG. 28 is a schematic side view of a first alternative embodiment to the transducer of FIG. 27A.
Figure 29:
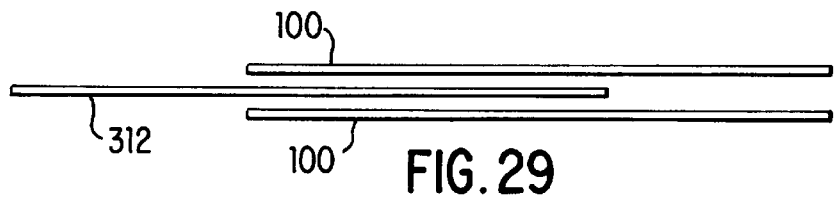
FIG. 29 is a schematic side view of a second alternative embodiment to the transducer of FIG. 27A.

The transducers of the present invention can be configured in various ways. For example, in the previously described embodiment of FIGS. 27A and 27B, two of the continuous conductive members 312 can be disposed on opposite sides of the read head 100, as shown in FIG. 28. By placing the read head 100 between two conductive members or scales, the receiver output signal strength can be increased. The read head 100 is symmetrical, which readily lends itself to use with two such conductive members 312. The read head 154 (FIG. 15) having portions of the loops 106 and 108 on both sides of a printed circuit board is particularly suited for use in the transducer of FIG. 28. Conversely, a single conductive member 312 can be disposed between two read heads 100, as shown in FIG. 29. The receiver output signals from the two read heads 100 can be combined to improve signal strength.

Figure 30:
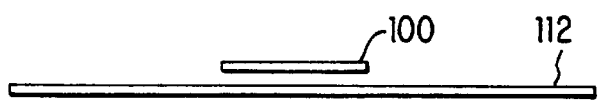
FIG. 30 is a schematic side view of the inductive transducer of FIG. 4A, showing the read head of FIG. 1 in operable engagement with the scale of FIG. 2.
Figure 31:
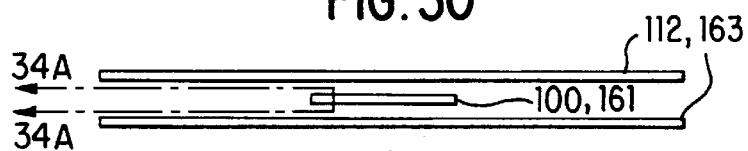
FIG. 31 is a schematic side view of a first alternative embodiment to the inductive transducer of FIG. 30.

The two configurations of the transducer 308 can be applied to the other transducer embodiments described herein. FIG. 30 schematically shows the above-described embodiments that employ the scale 112 that is substantially longer than the read head 100. FIG. 31 schematically shows two such scales 112, longer than the read head 100, disposed on opposite sides of the read head. In the arrangement of FIGS. 31 and 28, the read head 100 can be used in certain applications, such as a plunger gauge, where the read head 100 is coupled through a bushing acting as a seal, to a rod that allows the read head to move between two parallel scales 112. The arrangement of FIG. 31 also schematically shows an alternative embodiment to the rotary encoder 160 having two scales 163 disposed on opposite sides of the read head 161. The read head 161 can in this case consist of a portion of read head 161 from FIG. 16A (for example) which covers an arc substantially less than 360°. In such case, the read head 161 can be thought of essentially as a curved version of the read head 150 from FIG. 13.

Figure 32:
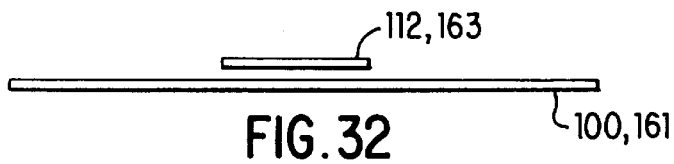
FIG. 32 is a schematic side view of a second alternative embodiment of the inductive transducer of FIG. 30.
Figure 33:
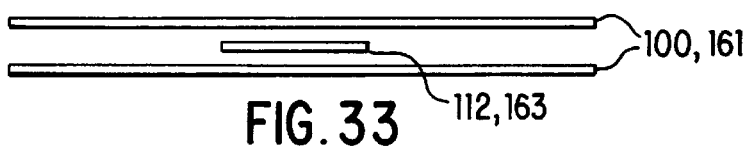
FIG. 33 is a schematic side view of a third alternative embodiment of the inductive transducer of FIG. 30.

Alternatively, the scale 112 can be smaller than the read head 100. As shown in FIG. 32, a single shortened scale 112 is disposed proximate to an elongated read head 100. As shown in FIG. 33, the shortened scale 112 is disposed between two parallel read heads 100. Again, the transducer arrangement of FIGS. 32 and 33 can be employed in certain applications, such as, for determining the height of a fluid, where the scale 112 is a conductive float that floats atop a fluid, with the read head 100 affixed to a side of a vessel holding the fluid. Also, the transducer configurations of FIGS. 32 and 33 may be employed as an alternative embodiment to the rotary encoder 160, where the scale 163 forms an arc substantially less than 360°.

Figure 34:
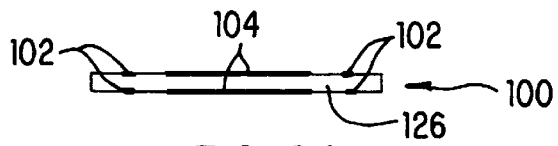
FIG. 34 is a schematic cross-sectional view of the read head of FIG. 31, taken along the line 34A—34A of FIG. 31.
Figure 35:
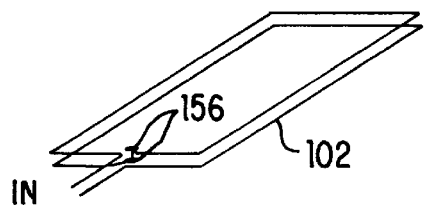
FIG. 35 is an isometric view of the transmitter winding in the inductive transducer of FIG. 31.

For the transducer configurations above having scales or conductive members on opposite sides of the read head, the receiver windings 104 are preferably deposited on opposite sides of the substrate 126, as shown in FIG. 34. The receiver windings 104 can be deposited on both sides of the substrate 126 similar to the read head 154 (FIG. 15), or as two sets of separate receiver windings 104, such as the receiver winding of the read head 136. The two sets of receiver windings 104 can be aligned with each other, or can be offset from each other as shown in FIG. 13 for the read head 150. As shown in FIG. 35, the transmitter winding 102 is preferably formed as two loops distributed on opposite sides of the substrate 126. A single via 156 intercouples the transmitter winding loops.

As described above, the flux disrupters or plates 114 disrupt or counteract the magnetic flux that extends through the receiver windings 104 to provide a measurement signal. In an alternative embodiment, the plates 114 are replaced by flux "enhancers" that provide an enhanced path for the magnetic flux to the receiver winding 104 to thereby increase the magnetic flux density through the receiver winding. A measurement signal is thereby induced in the receiver winding 104.

If an object of high magnetic permeability (i.e., a flux enhancer) is moved close to the read head 100, the varying magnetic field generated by the transmitter winding 102 will be provided with a lower reluctance path formed in the flux enhancer. As a result, the transmitter magnetic field produces a higher magnetic flux concentration or flux density proximate to the flux enhancer. Therefore, the magnetic flux that the receiver winding 104 receives is altered or enhanced proximate to the flux enhancer, causing the receiver winding to output a non-zero EMF signal. Consequently, a voltage measured at the output terminals $V^+$ and $V^-$ of the receiver winding 104 will change polarity as the flux disrupter moves between the "+" and "−" loops 106 and 108.

If the flux enhancer is moved along the read head 100, the varying magnetic field from the transmitter winding 102 will provide a greater magnetic flux through the receiver winding 104, proximate to the flux enhancer. If the flux enhancer is proximate to the receiver winding 104 and is positioned along the measuring axis 300, the AC amplitude of the signal output from the receiver winding will vary continuously and periodically with the wavelength 110 due to the periodic alteration of the loops 106 and 108 and the local enhancement of the transmitted magnetic field caused by the flux enhancer. The signal output from the receiver winding 104 preferably has a smooth, continuous sinusoidal shape in response to movement of the flux disrupter with respect to the receiver winding, as noted above. A continuous signal provides accurate position readings over extended distances along the measuring axis 300.

Figure 36:
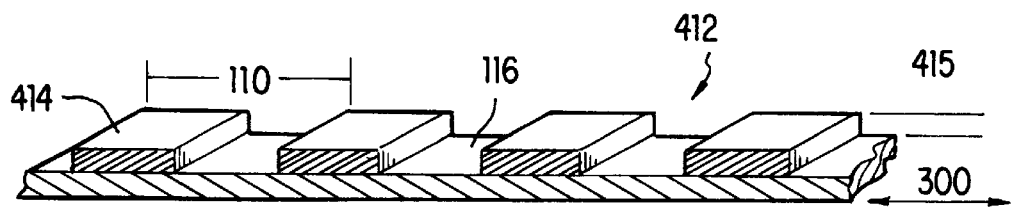
FIG. 36 is an isometric view of a portion of a sixth alternative embodiment of the scale of FIG. 2.

Referring to FIG. 36, a scale 412 includes multiple flux enhancers 414 received by the substrate 116. The enhancers 414 preferably have high magnetic permeability and low conductivity (highly resistive), such as ferrite. The flux enhancers 414 are also preferably non-magnetized so that they do not attract ferromagnetic particles. The substrate 116 is preferably of substantially lower magnetic permeability than the enhancers 414. The substrate 116 is also preferably non-conductive, especially when a thickness 415 of the enhancers 414 is small.

The enhancers 414, as with the conductive plates 114, preferably have a length equal to one-half the wavelength 110 and are arranged on a pitch of one wavelength. The thickness 415 of the enhancers is preferably such that it provides sufficient magnetic flux enhancement to provide high signal strength at the output of the receiver winding 104, comparable to or greater than the conductive plates in the previously described embodiments. Enhancers 414 having a greater thickness 415 provide greater receiver output signal strength, but enhancers of varying thicknesses can be chosen as governed by the need for signal strength, compact size, or other factors in a given application.

Figure 37A:
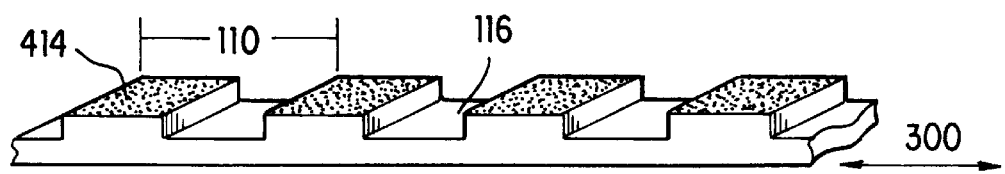
FIG. 37A is an isometric view of a portion of a seventh alternative embodiment of the scale of FIG. 2.

Various alternative layouts for the enhancers 414 can be employed under the present invention. For example, a scale 433 shown in FIG. 37A includes the support member 116 that is substantially of the same material as the enhancers 414. The enhancers 414 are formed as raised or protruding portions in the supporting member 116 by using, e.g., a surface contouring process. The enhancers 414 are distinguished from the supporting member 116 in the scale 433 by their proximity to the loops 106 and 108 when placed in relation to the read head 100. The closer proximity of the enhancers 414 in the scale 433 to the read head 100 decreases the magnetic path reluctance for that portion of the magnetic flux proximate to the enhancers, which has an effect comparable to a permeability variation. As a result, the scale 133 operates in a manner substantially similar to the scale 412.

Figure 37B:
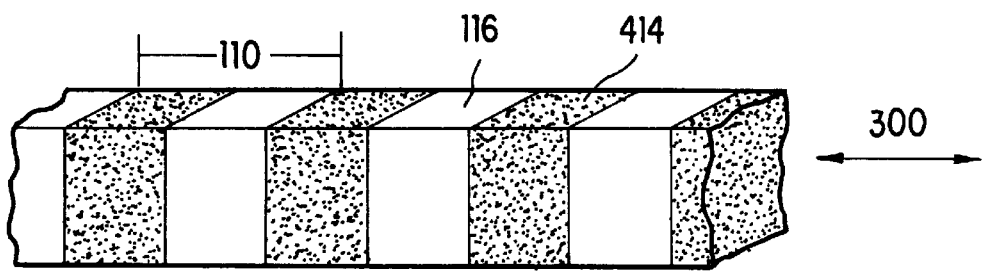
FIG. 37B is an isometric view of a portion of an eighth alternative embodiment of the scale of FIG. 2.

Alternatively, a scale 434 shown in FIG. 37B includes the support member 116 that forms less magnetically-permeable laminations (such as alumina) which are alternatingly secured or bonded between the enhancers 414. The enhancers 414 are defined by their exposed surfaces. The support member 116, a spacing and bonding member of the less permeable material, together with the enhancers 414, form an alternating stack of more and less magnetically permeable material.

The support member 116 in the scale 434 can be of an electrically conductive material so as to act as flux disrupters as described above. As a result, the scale 434 includes both flux enhancers and flux disrupters to provide a roughly additive result, which produces a stronger receiver output signal than if only flux disrupters or flux enhancers were used alone.

Figure 37C:
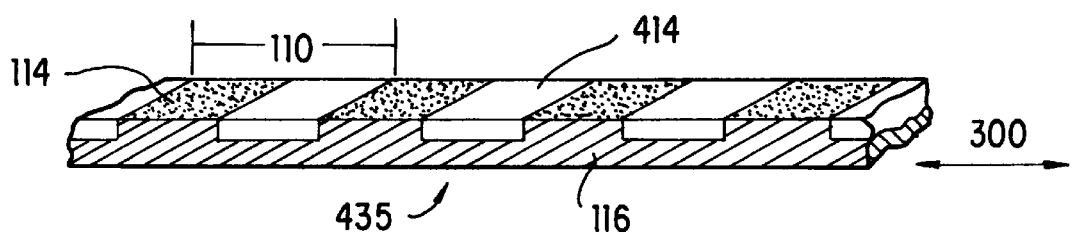
FIG. 37C is an isometric view of a portion of a ninth alternative embodiment of the scale of FIG. 2.

A particularly useful scale construction which combines both flux enhancers and flux disrupters on a single supporting member is shown in FIG. 37C as the scale 435. The scale 435 includes the disrupters 114 that are formed integral to the support member 116 (as previously described with respect to FIG. 5B), and which are preferably formed of a highly conductive, durable and stable metal. The enhancers 414 are secured or bonded into spaces or recesses provided between the disrupters 114. As a result, since the enhancers 414 are preferably formed of ferrite, which is a mechanically weak material, the supporting member 116 with disrupters 114 provide mechanical support and greater durability for the enhancers.

All of the previously described geometric design principles and circuits disclosed herein can be employed to produce the high accuracy and other benefits described herein by employing the flux enhancers 414 to enhance the magnetic flux through the receiver winding 104. The various read head geometries described above and shown in the figures, as well as the circuit concepts and mechanical configurations disclosed herein, can all be employed to provide substantial accuracy improvements to prior art "enhancer-type encoders" when the flux enhancers 414 are substituted for the flux disrupter elements 114. The low-power circuit techniques described above can be used with the flux enhancers 414 and still retain their low-power benefits. In all cases, it would be understood to those skilled in the relevant art that when a flux enhancer 414 is substituted for a disrupter 114, the polarity of the resulting signal is inverted.

Those skilled in the art will recognize various additional modifications that can be made to the flux enhancer embodiment described above. For example, although the supporting member 116 is preferably non-conductive (highly resistive), it can be conductive, depending on manufacturing considerations, provided that the flux density proximate to the enhancers 414 is operably different from the flux density between the enhancers (as caused by the conductive support member). Alternatively, a monolithic enhancer can be constructed, similar to the scale 433, whereby the enhancers 414 are distinguished from the support member 116 by processes that alter the magnetic permeability of the support member, or alter the reluctance of certain magnetic paths through the support member, such as by adding or plating an additional material of a different type on the support member.

As explained above, the present invention provides an inductive transducer capable of providing high accuracy position signals, and which can be inexpensively manufactured using printed circuit board technology. The present invention is insensitive to contamination by particles, including ferromagnetic particles, as well as oil, water and other fluids. As a result, the transducer of the present invention can be used in most shop environments. The present invention does not require sophisticated or costly seals to prevent contamination from entering the transducer. A fairly large gap 127 (up to 2 mm) can be used while still providing acceptable receiver output signals and high accuracy. Consequently, precise assembly tolerances are not critical in the present inductive encoder, and therefore it may be manufactured more inexpensively as opposed to other types of encoders.

The receiver windings, or read head, are preferably formed within a thin zone that has a height substantially less than the width or length of the zone. As a result, the present invention can be adapted to many applications since it requires substantially less volume than prior art transducers. The receiver windings of the present invention consist of simple conductors, and therefore are considered fundamentally passive. The receiver windings' fundamental purpose is to generate an EMF induced by the magnetic fields received. The EMF is analyzed by an appropriate analyzing circuit to measure movement of the read head along the measuring axis with respect to the scale. Although it is possible to design an analyzing circuit which analyzes the field-induced EMF by active means which influence the receiver windings, for purposes of description herein, it is intended that this approach would be regarded as an analyzing signal superimposed upon the fundamentally passive response of the receiver windings.

The scale of the present invention is passive, and therefore needs no wiring or connections to electronics. As a result, the present invention can be more reliable, more easily packaged and mounted into a variety of applications, and more easily incorporated into hand-held measurement tools than other inductive-type encoders. Furthermore, the present invention provides a low-power driving circuit that further permits the inductive encoder of the present invention to be readily incorporated in battery-powered and solar cell-powered hand-held tools, and other low-power applications.

Those skilled in the art will recognize that the above-described invention provides an inductive transducer that may be incorporated into various applications. Although specific embodiments of, and examples for, the present invention have been described for purposes of illustration, various equivalent modifications can be made without departing from the spirit and scope of the present invention. For example, while sinusoidal, rectangular and triangular loops 106 and 108 are shown and described with respect to the receiver winding 104, various other geometries are possible, including different geometries for different phases in a given read head. Similarly, while generally rectangular conductive bars are shown and described herein, other geometries can be used. In the case that these geometries lead to non-sinusoidal functions of signal out versus displacement, then the actual function can be modeled in a look-up table, or by other means known to those skilled in the art, and the position calculating equations described herein can be modified or replaced according to well-known signal processing techniques.

Additionally, the present invention has been generally described with respect to relative position encoders. The present invention can be adapted for use in absolute position encoders by, for example, providing several parallel or concentric receiver windings having differing wavelengths, which inductively couple with several parallel or concentric scales similarly having different wavelengths. Furthermore, while the inductive transducer of the present invention has been generally described for use in position encoders, the transducer may be used in any applicable non-measurement application such as presence detectors or resolvers. Accordingly, the present invention is not limited by the disclosure, but instead its scope is to be determined entirely by reference to the following claims.

We claim:

1. An inductive position transducing system including a low power electronic circuit, the inductive position transducing system comprising:
   a first member;
   a second member having a measuring axis, the first member movable relative to the second member along the measuring axis;
   a low power energy supply source that provides a power supply;
   a signal generator circuit that inputs the power supply from the low power energy supply source and that outputs an intermittent drive signal;
   an inductive transducer that inputs the intermittent drive signal, comprising:
      a first portion located on one of the second member and the first member, comprising:
         at least one magnetic field generator, each magnetic field generator generating a changing magnetic flux in a flux region in response to the intermittent drive signal, and
         at least one magnetic flux sensor, each magnetic field sensor sensing the spatially modulated changing magnetic flux in a region proximate to the magnetic flux sensor and generating at least one sensed signal, and
      a second portion located on the other of the second member and the first member, comprising at least one flux modulator arranged along the measuring axis, each flux modulator positionable within the flux region and capable of providing a spatially modulated changing magnetic flux proximate to the magnetic flux sensor, wherein each sensed signal is responsive to a relative position between the corresponding magnetic flux sensor and the at least one flux modulator based on the sensed magnetic flux; and
   an analyzing circuit that inputs the at least one sensed signal and outputs an output signal indicative of the relative position between the first member and the second member along the measuring axis.

2. The position transducing system of claim 1, wherein the at least one magnetic field generator and the at least one magnetic flux sensor are formed by conductive windings.

3. The position transducing system of claim 2, wherein:
   the at least one magnetic field generator comprises a plurality of conductive windings;
   each conductive winding of the magnetic field generator is formed in a pattern, the pattern being spatially modulated along the measuring axis and having a defined spatial phase position along the measuring axis; and
   the signal generator circuit outputs a plurality of intermittent drive signals to the plurality of conductive windings, each drive signal having a different temporal phase.

4. The position transducing system of claim 1, wherein the first member and the second member are relatively planar elements and each of the magnetic field generator, magnetic flux sensor and the flux modulator are arranged in a thin zone on the surfaces of the first and second members.

5. The position transducing system of claim 1, wherein the at least one magnetic field generator comprises a single magnetic field generator and the signal generator circuit includes:
   voltage supply and ground terminals, a first terminal of the magnetic field generator coupled to the voltage supply terminal;
   a capacitor having first and second terminals, the first terminal of the capacitor coupled to a second terminal of the magnetic field generator;
   a switch element having first, second and control terminals, the first terminal of the switch element coupled to the second terminal of the capacitor, the second terminal of the switch coupled to the ground terminal and the control terminal intermittently driven; and a resistor having a first terminal coupled to the voltage supply terminal and a second terminal coupled to the second terminal of the capacitor.

6. The position transducing system of claim 1, wherein the signal generator circuit includes at least one resonant circuit capacitor, each resonant circuit capacitor coupled in parallel with a corresponding one of the at least one magnetic field generator, each resonant circuit capacitor having a capacitance resonantly matched with an inductance of the corresponding magnetic field generator.

7. The position transducing system of claim 1, wherein the signal generator circuit is controlled to initiate at least one episode of changing magnetic flux generated by the at least one magnetic field generator, the at least one episode initiated at a selected sample interval.

8. The position transducing system of claim 1, wherein:
the at least one flux modulator comprises a plurality of flux modulators arranged on the other of the first and second members at a fixed pitch along the measuring axis; and
the analyzing circuit includes:
an accumulator,
means for detecting when relative motion between the at least one flux modulator and the at least one magnetic flux sensor exceeds an increment equal to the fixed pitch and for incrementing or decrementing the accumulator depending on a direction of the relative motion, and
means for combining information of the accumulator with a spatial position within an interval equal to the fixed pitch, such that positions corresponding to relative motion beyond one fixed pitch are unambiguously determined.

9. The position transducing system of claim 1, wherein the analyzing circuit demodulates the at least one sensed signal output by the inductive transducer synchronously with the changing magnetic flux.

10. The position transducing system of claim 1, wherein the measuring axis is circular or linear.

11. The position transducing system of claim 1, wherein the signal generator circuit includes a voltage pulse generator.

12. The position transducing system of claim 1, wherein the intermittent drive signal comprises a single pulse discharged from a capacitor of the signal generator circuit through the inductive transducer and a following interval with no pulse discharge.

13. The position transducing system of claim 1, wherein the signal generator circuit produces a drive signal substantially in resonance with the inductive transducer.

14. An inductive position transducing system including a low power electronic circuit, the inductive position transducing system comprising:
a first member;
a second member having a measuring axis the first member movable relative to the second member along the measuring axis;
a low power energy supply source that provides a power supply;
a signal generator circuit that inputs the power supply from the low power energy supply source and that outputs an intermittent drive signal and comprises a capacitor discharged through the inductive transducer;

an inductive transducer, comprising:
a first portion located on one of the second member and the first member, and
a second portion located on the other of the second member and the first member,
wherein the inductive transducer inputs the intermittent drive signal and outputs at least one sensed signal responsive to a relative position along the measuring axis between the first member and the second member; and
an analyzing circuit that inputs the at least one sensed signal and outputs an output signal indicative of the relative position between the first member and the second member along the measuring axis.

15. An inductive position transducing system including a low power electronic circuit the inductive position transducing system comprising:
a first member;
a second member having a measuring axis, the first member movable relative to the second member along the measuring axis;
a low power energy supply source that provides a power supply;
a signal generator circuit that inputs the power supply from the low power energy supply source and that outputs an intermittent drive signal, the signal generator circuit and drive signal drive the inductive transducer such that the inductive transducer produces a changing magnetic flux which changes at a rate equivalent to an oscillation frequency of at least 1 MHz;
an inductive transducer, comprising:
a first portion located on one of the second member and the first member, and
a second portion located on the other of the second member and the first member,
wherein the inductive transducer inputs the intermittent drive signal and outputs at least one sensed signal responsive to a relative position along the measuring axis between the first member and the second member; and
an analyzing circuit that inputs the at least one sensed signal and outputs an output signal-indicative of the relative position between the first member and the second member along the measuring axis.

16. The position transducing system of claim 15, wherein the changing magnetic flux changes at a rate equivalent to an oscillation frequency of at least 7 MHz.

17. An inductive position transducing system including a low power electronic circuit, the inductive position transducing system comprising:
a first member;
a second member having a measuring axis, the first member movable relative to the second member along the measuring axis;
a low power energy supply source that provides a power supply and is carried solely on one of the first and second members;
a signal generator circuit that inputs the power supply from the low power energy supply source and that outputs an intermittent drive signal
an inductive transducer, comprising:
a first portion located on one of the second member and the first member, and
a second portion located on the other of the second member and the first member, wherein the inductive transducer inputs the intermittent drive signal and outputs at least one sensed signal responsive to a relative position along the measuring axis between the first member and the second member; and an analyzing circuit that inputs the at least one sensed signal and outputs an output signal indicative of the relative position between the first member and the second member along the measuring axis.

18. The position transducing system of claim 1, wherein the low power energy supply source comprises one of a battery power source and a solar cell.

19. The position transducing system of claim 1, wherein a maximum supply voltage of the low power energy supply source is at most 12.5 volts.

20. An inductive position transducing system including a low power electronic circuit, the inductive position transducing system comprising:

a first member;

a second member having a measuring axis, the first member movable relative to the second member along the measuring axis;

a low power energy supply source that provides a power supply, wherein a maximum supply voltage of the low power energy supply source is at most 3.5 volts;

a signal generator circuit that inputs the power supply from the low power energy supply source and that outputs an intermittent drive signal;

an inductive transducer, comprising:
  a first portion located on one of the second member and the first member, and
  a second portion located on the other of the second member and the first member,
  wherein the inductive transducer inputs the intermittent drive signal and outputs at least one sensed signal responsive to a relative position along the measuring axis between the first member and the second member; and an analyzing circuit that inputs the at least one sensed signal and outputs an output signal indicative of the relative position between the first member and the second member along the measuring axis.

21. An inductive position transducing system including a low power electronic circuit, the inductive position transducing system comprising:

a first member:

a second member having a measuring axis, the first member movable relative to the second member along the measuring axis;

a low power energy supply source that provides a power supply;

a signal generator circuit that inputs the power supply from the low power energy supply source and that outputs an intermittent drive signal;

an inductive transducer, comprising:
  a first portion located on one of the second member and the first member, and
  a second portion located on the other of the second member and the first member,
  wherein the inductive transducer inputs the intermittent drive signal and outputs at least one sensed signal responsive to a relative position along the measuring axis between the first member and the second member; and an analyzing circuit that inputs the at least one sensed signal and outputs an output signal indicative of the relative position between the first member and the second member along the measuring axis, wherein a feature of one of the first member and the second member forms one of the first and second portions of the inductive transducer.

22. The position transducing system of claim 21, wherein the one of the first and second members is a gear, and the feature is a gear-tooth structure.

23. A method for operating an inductive position transducing system, comprising:

providing a power supply from a low power energy supply source to a signal generator circuit;

intermittently outputting a drive signal from the signal generator to an inductive transducer;

driving the inductive transducer with the intermittent drive signal to produce a changing magnetic flux, producing a spatially modulated changing magnetic flux based on a relative position between first and second members of the inductive transducer along a measuring axis;

sensing the spatially modulated changing magnetic flux to produce at lease one sensed signal corresponding to the relative position between the first and second members along the measuring axis;

monitoring the at least one sensed signal output by the inductive transducer; and determining, in response to the at least one monitored sensed signal, the relative position between the first and second members.

24. The method of claim 23, wherein intermittently outputting the drive signal includes:

discharging a single pulse from a capacitor through the inductive transducer; and providing an interval with no pulse discharge.

25. The method of claim 23, wherein outputting the drive signal includes producing the drive signal substantially in resonance with the inductive transducer.

26. The method of claim 23, wherein driving the inductive transducer comprises producing the changing magnetic flux in the inductive transducer such that the changing magnetic flux has a change rate equivalent to an oscillation frequency of at least 1 MHz.

27. The method of claim 26, wherein the change rate is equivalent to an oscillation frequency of at least 7 MHz.

28. The method of claim 23, wherein monitoring the at least one sensed signal output by the inductive transducer includes demodulating the at least one sensed signal synchronously with the changing magnetic flux.

29. The method of claim 23, wherein providing the power supply comprises operating the inductive transducer from the low power energy supply source for an extended period of time.

30. The method of claim 23, wherein producing the spatially modulated changing magnetic flux comprises spatially modulating the changing magnetic flux using at least one flux modulator.

31. A method for operating an inductive position transducing system positioned in a portable measuring device and having a self-contained low power energy supply source, the method comprising:

providing a power supply from the self-contained low power energy supply source to a signal generator circuit;

intermittently outputting a drive signal from the signal generator circuit to an inductive transducer;

driving the inductive transducer with the intermittent drive signal to produce a changing magnetic flux;

producing a spatially modulated changing magnetic flux based on a relative position between first and second members of the inductive transducer along a measuring axis;

sensing the spatially modulated changing magnetic flux to produce at lease one sensed signal corresponding to the relative position between the first and second members along the measuring axis;

monitoring the at least one sensed signal output by the inductive transducer; and determining, in response to the at least one monitored sensed signal, the relative position between the first and second members.

32. The method of claim 31, wherein providing the power supply comprises operating the inductive transducer from the low power energy supply source for an extended period of time.

33. The inductive position transducing system of claim 1, wherein the capacitor and the at least one of the at least one magnetic field generator form a resonant circuit.

34. The inductive position transducing system of claim 1, wherein the intermittent drive signal comprises at least one pulse signal.

35. The inductive position transducing system of claim 1, wherein the energy supply source is a self-contained, low-power energy supply source.

36. The inductive position transducing system of claim 1, wherein the drive circuit comprises a capacitor discharged through the at least one of the at least one magnetic field generators.

37. The inductive position transducing system of claim 1, wherein energy is conserved by creating a resonant circuit between a capacitor and a magnetic field generator of the inductive transducer and disconnecting the capacitor in close proximity to a resonant peak of the resonant circuit.

* * * * *